United States Patent [19]
Johnson et al.

[11] Patent Number: 5,796,972
[45] Date of Patent: Aug. 18, 1998

[54] METHOD AND APPARATUS FOR PERFORMING MICROCODE PAGING DURING INSTRUCTION EXECUTION IN AN INSTRUCTION PROCESSOR

[75] Inventors: David C. Johnson, Roseville; Douglas A. Fuller, Eagan; Kenneth L. Engelbrecht, Blaine, all of Minn.; Gregory A. Marlan, San Jose, Calif.; Ronald G. Arnold, Apple Valley; Gerald G. Fagerness, Mazeppa, both of Minn.

[73] Assignee: Unisys Corporation, Blue Bell, Pa.

[21] Appl. No.: 783,614

[22] Filed: Jan. 14, 1997

[51] Int. Cl.$^6$ .................................................. G06F 9/24
[52] U.S. Cl. ........................................ 395/384; 395/182.06
[58] Field of Search .................................... 395/384, 381, 395/182.06

[56] References Cited

U.S. PATENT DOCUMENTS

| 4,093,982 | 6/1978 | Heuer et al. | 395/598 |
|---|---|---|---|
| 4,153,933 | 5/1979 | Blume et al. | 711/219 |
| 4,354,232 | 10/1982 | Ryan | 711/118 |
| 4,450,519 | 5/1984 | Guttag et al. | 395/800.33 |
| 4,503,500 | 3/1985 | Magar | 395/800.33 |
| 4,691,279 | 9/1987 | Danilenko et al. | 364/200 |
| 4,714,994 | 12/1987 | Oklobdzija et al. | 395/383 |
| 4,835,679 | 5/1989 | Kida et al. | 395/388 |
| 4,855,947 | 8/1989 | Zmyslowski et al. | 395/392 |
| 4,888,689 | 12/1989 | Taylor et al. | 711/140 |
| 4,905,188 | 2/1990 | Chuang et al. | 711/128 |
| 4,924,376 | 5/1990 | Ooi | 395/383 |
| 4,942,520 | 7/1990 | Langendorf | 711/140 |
| 4,953,121 | 8/1990 | Muller | 395/588 |
| 4,980,823 | 12/1990 | Liu | 711/136 |
| 5,454,100 | 9/1995 | Sagane | 395/182.06 |

OTHER PUBLICATIONS

Bandyopadhyay et al., Micro–Code Based RISC Architecture, 19th Southeaster Symposium on System Theory, Mar., 1987, pp. 411–414.

Bandyopadhyay et al., "Combining Both Micro–Code and Hardwired Control in RISC", Computer Architecture News, Sep. 1987.

*Primary Examiner*—David Y. Eng
*Attorney, Agent, or Firm*—Nawrocki, Rooney & Sivertson, P.A.

[57] ABSTRACT

Method and apparatus for performing microcode paging during instruction execution in an instruction processor. In a preferred embodiment an instruction processor is provided that includes both a microcode ROM and a microcode RAM. The microcode ROM stores the current release of the microcode for the computer system, and the microcode RAM stores microcode patch instructions. During instruction execution, the present invention selects between the output of the microcode ROM and the microcode RAM, depending on whether the instruction requires a patch microcode instruction. If the desired microcode patch instruction is not stored in the microcode RAM, the instruction processor is temporarily interrupted and the desired microcode patch instruction or a group of microcode patch instructions are written, or paged, into the microcode RAM.

48 Claims, 17 Drawing Sheets

METHOD AND APPARATUS FOR PERFORMING MICROCODE PAGING DURING INSTRUCTION EXECUTION IN AN INSTRUCTION PROCESSOR

CROSS REFERENCE TO CO-PENDING APPLICATIONS

The present application is related to U.S. patent application Ser. No. 08/686,258, filed Jul. 25, 1996, entitled "REDIRECT CONTROL FOR AN INSTRUCTION PROCESSOR", and U.S. patent application Ser. No. 08/288, 651 filed Aug. 9, 1994, (a continuation of U.S. patent application Ser. No. 07/762,262, filed Sep. 19, 1991, now abandoned), entitled "COOPERATIVE HARDWARE AND MICROCODE CONTROL SYSTEM FOR PIPELINED INSTRUCTION EXECUTION", now U.S. Pat. No. 5,577, 259, both of which are assigned to the assignee of the present invention, and both are incorporated herein by reference.

BACKGROUND OF THE INVENTION

1. Field of the Invention

The present invention generally relates to general purpose digital data processing systems, and more particularly relates to such systems that employ memories for storing microcode in an instruction processor.

2. Description of the Prior Art

The integration of modern computer systems has been increasing at a rapid rate. The density of modern integrated circuits is increasing exponentially, and printed circuit board densities are increasing as well. This allows system designers to integrate several boards of previous computer systems onto a single IC. Further, fewer printed circuit boards are required. The integration of computer systems has a number of advantages, including increased performance, lower power, more reliability, and a reduced cost.

A difficulty with increased integration is that hardware changes may be difficult and/or expensive to correct, particularly during the design cycle of a computer system. Hardware errors may be found, including logic errors, timing errors or any other type of error that reduces the effectiveness of the computer system. These errors are typically found during design verification, but may be found much later, and even after the computer system is shipped to customers.

In the past, mechanical methods were used to make hardware corrections. These mechanical methods include providing jumper wires, re-fabricating a printed circuit board, interchanging an integrated circuit, etc. However, with the increased integration of computer systems, mechanical methods of correcting hardware errors are often not practical (i.e. expensive) or even not possible. A primary source of this difficulty is that the internal hardware is simply not accessible. For example, to correct a hardware error in an ASIC (Application Specific Integrated Circuit) within the design, it may be necessary to create a new set of masks, and re-fabricate the integrated circuit before further verification can continue. This not only can be expensive, but can have a long turn around time. Likewise, and because many of today's printed circuit board are multi-layered, it may not always be possible to access a trace to correct a hardware error. Thus, is may be necessary to re-fabricate the printed circuit board before further verification can continue. This may also be relatively expensive and can have a long turn around time.

For these and other reasons, most modern computer systems use micro-code to control the major data paths and control points within a computer system. This may allow a system designer to provide a work around for many of the errors that are detected by modifying the microcode. Thus, many of the hardware errors may be corrected, at least for further verification purposes, by changing the microcode. This may allow the verification process to continue, and the system designer may continue to identify other hardware errors in the design, if any. After the verification process is completed, the system designer may correct the known hardware errors in a single pass. This may significantly reduce the design cycle time of modern day computer systems. In addition, in many cases only a few functions may be affected by a hardware error, and the work around microcode corrections may be sufficient until the next design revision of the computer system is released.

To implement the microcode control, typical computer systems include an instruction processor, that may have an instruction cache, a decoder block, and a microcode ROM. Typically, an instruction is read from the instruction cache, and is decoded by the decoder. The decoder then provides a decoded address to the microcode ROM. The microcode ROM then provides a corresponding microcode instruction to the data processing system, including a number of control signals for controlling the major data paths and control points therein.

Some designers may use a microcode RAM rather than a microcode ROM until the design is verified, and then replace the microcode RAM with a microcode ROM. This may allow the microcode to be changed during the design process, to work around identified hardware errors. However, a ROM is typically desired in the final product because it is cheaper, uses less power, and typically uses less board space. Thus, after the computer system is fully verified, the final microcode is typically burned into a microcode ROM and inserted into the computer system, and the microcode RAM is removed.

The above approach suffers from a number of limitations, some of which are described below. First, a microcode RAM and microcode ROM typically do not have the same printed circuit board foot print, and therefore the microcode RAM cannot simply be replaced with a microcode ROM. Rather, either a separate location must be provided on the printed circuit board for the microcode RAM, or a new printed circuit board must be fabricated before the microcode ROM is positioned on the printed circuit board. In the former case, significant printed circuit board real estate may be wasted because the footprint for the microcode RAM must be provided on the printed circuit board, but the microcode RAM may not be included in the final design. In the latter case, re-fabricating the printed circuit board to accommodate the microcode ROM may be expensive and may require a lengthy turn around time.

Another limitation of the above approach is that hardware errors may be detected after the computer system is released to the users. Extensive use by a number of users may detect hardware errors that were not detected during the design verification process. Further, new software programs may reveal previously un-recognized hardware errors. Because only a microcode ROM may be provided in the released computer system, the microcode may not be easily changed to provide a work around for these later discovered hardware errors.

SUMMARY OF THE INVENTION

The present invention overcomes the disadvantages found in the prior art by providing computer system that includes both a microcode ROM and a microcode RAM. The microcode ROM may store the current release of the microcode for the computer system, and the microcode RAM may store microcode patch instructions. During instruction execution, the present invention may select between the output of the microcode ROM and the microcode RAM, depending on whether the instruction requires a patch microcode instruction.

In a preferred embodiment, an instruction processor is provided that includes an instruction cache, a decode block, a microcode RAM, a microcode ROM, and a selector block. The instruction cache sequentially provides instructions to the decoder block during instruction execution. The decoder block then decodes each instruction, and provides a decoded instruction address to the microcode RAM and microcode ROM. The microcode RAM and microcode ROM read the contents at the corresponding address location, and each provided a corresponding microcode instruction. The selector block selects which of the instructions to executed. If the current instruction does not require a microcode patch, the output of the ROM is selected. If, however, the current instruction requires a microcode patch, the output of the RAM is selected.

Because a RAM typically is more expensive, uses more power, and uses more printed circuit board space than a ROM, it is often desirable to maximize the use of ROMs and minimize the use and size of RAMS. To minimize the size of the microcode RAM, it is contemplated that not all of the microcode patch instructions may be stored therein. Rather, only a subset, or group, of microcode patch instructions may be stored in the microcode RAM. If an instruction requires a patch instruction that is not currently stored in the microcode RAM, a support processor or the like may be notified and the desired microcode patch instruction may be written, or paged, into the microcode RAM. Thereafter, instruction execution may continue. This may conserve valuable printed circuit board and RAM resources.

The decode block may include an Instruction Decode RAM (ID RAM) (or an ID ROM), and may decode the instructions using a look-up table type algorithm. Thus, each instruction may provide an address to the ID RAM, and the ID RAM may provide a decoded address to the microcode ROM and microcode RAM. The ID RAM may also provide other control bits to control other predetermined portions of the data processing system.

It is contemplated that the number of microcode patch instructions may be divided into a number of groups. Each group of microcode patch instructions may support a selected instruction or group of instructions. To designate the groups, the microcode RAM may store a group code for each microcode patch instruction, wherein the group code indicates the instructions that are supported thereby.

Because the microcode RAM may only store a subset of microcode patch instructions, and not all of the microcode patch instructions, it is desirable to determined whether the subset of microcode patch instructions stored in the microcode RAM support the current instruction provided by the ID RAM. In a preferred embodiment, this is accomplished by comparing a group code provided by the ID RAM with the group code provided by the microcode RAM. If the group codes match, the microcode patch instruction supports the instruction provided by the ID RAM, and the execution of the microcode patch instruction may continue.

As indicated above, when a desired microcode patch instruction is not found in the microcode RAM, as indicated by a mismatch of group codes, the microcode RAM must be loaded with the desired microcode patch instruction. In a first illustrative embodiment, it is contemplated that only the desired microcode patch instruction may be loaded. Alternatively, it is contemplated that an entire group of patch instructions may be transferred to the microcode RAM.

Finally, it is contemplated that only the most common patch instructions may be stored in the microcode RAM, and when an instruction is encountered that requires another microcode patch instruction, the correct microcode patch instruction may be written to the microcode RAM. Thereafter, the group of common patch instructions may again be written back to the microcode RAM.

It is contemplated that the ID RAM may also provide a CS RAM SELECT bit. The CS RAM SELECT bit may select between the microcode instructions provided by the microcode ROM and the microcode patch instruction provided by the microcode RAM. If an instruction does not require a microcode patch, the CS RAM SELECT bit may select the output of the microcode ROM. If, however an instruction does require a microcode patch (e.g. because of a hardware error, etc.), the CS RAM SELECT bit may select the output of the microcode RAM. By providing a group code and a CS RAM SELECT bit, the ID RAM may correctly deliver the appropriate microcode patch instruction to the data processing system.

Finally, it is contemplated that an interrupt block may be provided. The interrupt block may interrupt the execution of the instruction processor while a microcode patch instruction or a group of microcode patch instructions are loaded into the microcode RAM, preferably from a support processor.

The present invention provides an ideal environment for debugging a circuit design. The main microcode may be provided in the microcode ROM. The microcode patch instructions, which may be used to overcome hardware errors within the system, may be stored in the microcode RAM. This may allow the computer system to continue to operate after hardware errors are detected by simply loading new microcode patch instructions, rather than replacing a microcode ROM element or making some other physical modification.

After final verification of the system, the hardware errors may be physically corrected, and the instructions in the microcode RAM may no longer be needed. However, and because hardware errors may be detected by the end users after the computer system is released, the microcode RAM may still be provided for storing yet to be determined microcode patch instructions. This may allow the computer system to continue to operate by simply loading new microcode patch instructions, rather than replacing a microcode ROM element or making some other physical modification.

Finally, it is contemplated that the present invention may be used to execute instructions using a reduced size microcode storage element. That is, in come cases it may be desirable to reduce the size of the microcode memory element, for example the microcode ROM. The present invention contemplates replacing both the microcode ROM and microcode RAM, as described above, with a microcode RAM. The microcode RAM may be sized to only store a subset of the total microcode instruction set. This may reduce the size, power and cost of the microcode memory function.

The computer system may then operate in a similar manner as that described above. The most commonly used microcode instructions may be stored in the microcode RAM. If an instruction is executed that requires a microcode instruction that is not stored within the microcode RAM, a support processor or the like may load the appropriate microcode instruction into the microcode RAM. Thereafter, instruction execution may continue. Finally, the instruction processor of this embodiment may detect when an instruction is not supported by the current contents of the microcode RAM by comparing corresponding group codes, as described above.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENTS

Figure 1:
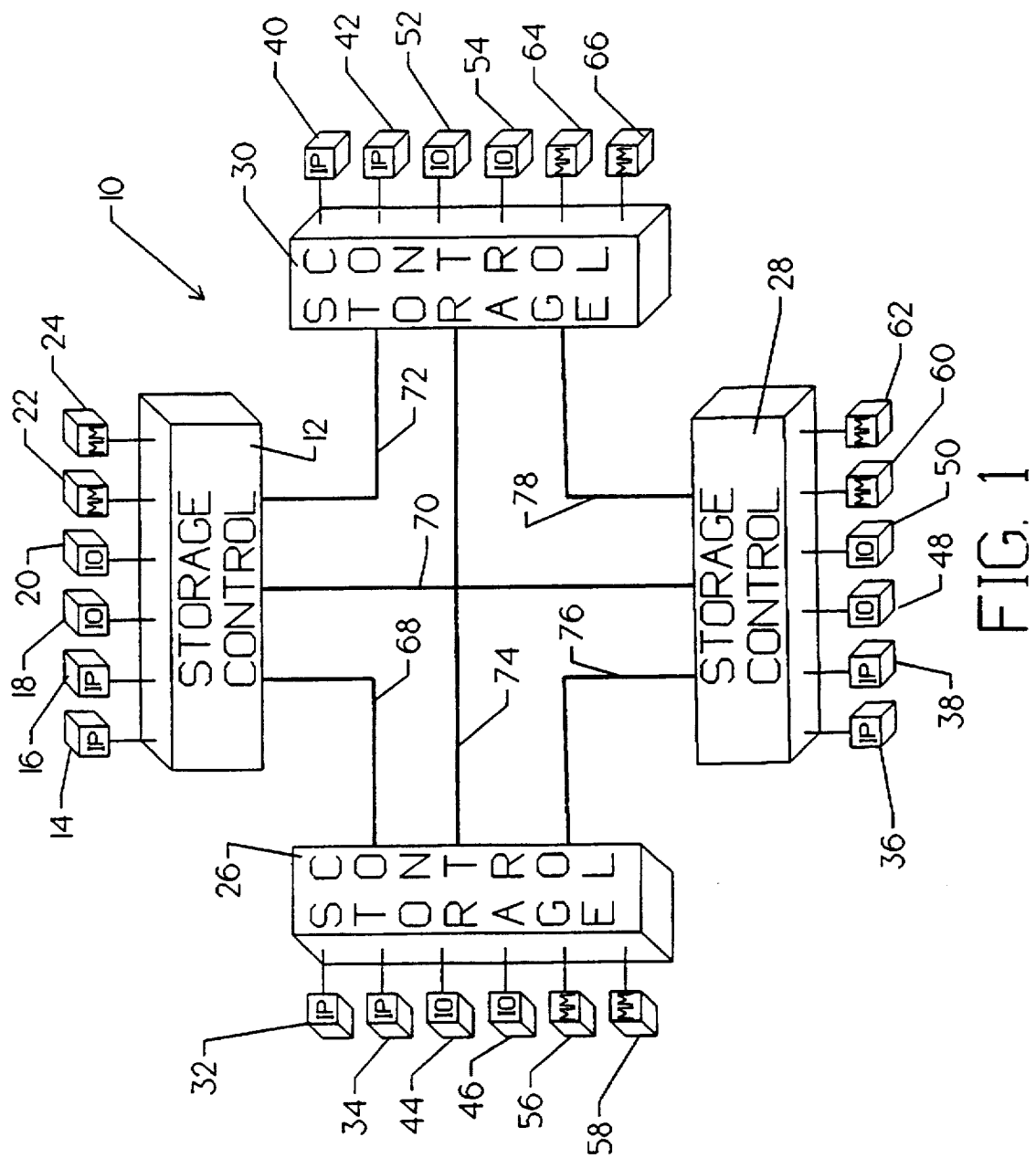
FIG. 1 is a schematic diagram of a fully populated data processing system incorporating the present invention.

FIG. 1 is an overall diagram of fully populated data processing system 10 according to the present invention.

Data processing system 10 includes four individual processing clusters, each having its own storage controller and each having point-to-point communication with the other clusters via a storage controller-to-storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above-referenced and commonly assigned copending U.S. patent application which has been incorporated by reference.

Input/output processors 18 and 20, along with main memory modules 22 and 24, may be elements currently available, such as found in the Unisys Model 2200/600 series. Input/output processors 44, 46, 48, 50, 52 and 54 and main memory modules 56, 58, 60, 62, 64 and 66 may be similarly found.

Figure 2:
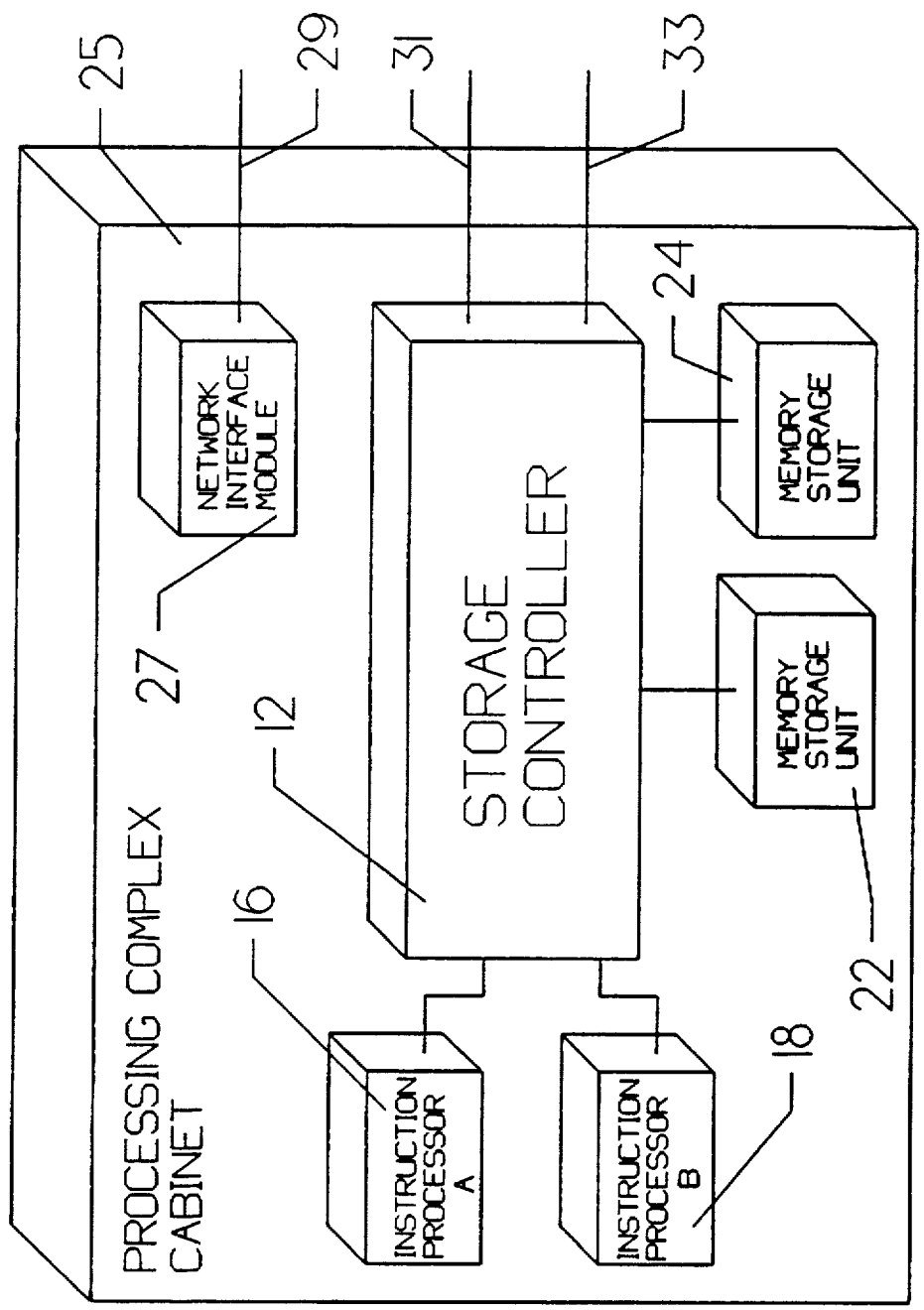
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e., IPA and IPB). In the preferred mode, each of these instruction processors is packaged on a single high density circuit board. The memory storage units 22 and 24 are coupled to storage controller 12 as explained above.

Network interface module (i.e., NIM) 27 provide an interface to the operator console via cable 29. Cables 31 and 33 couple input/output units 18 and 20 (see also, FIG. 1) to storage controller 12. Input/output units 18 and 20 are physically packaged in an Input/output Complex Cabinet (i.e., ICC) which is not shown for clarity. Other referenced elements are as previously described.

Figure 3:
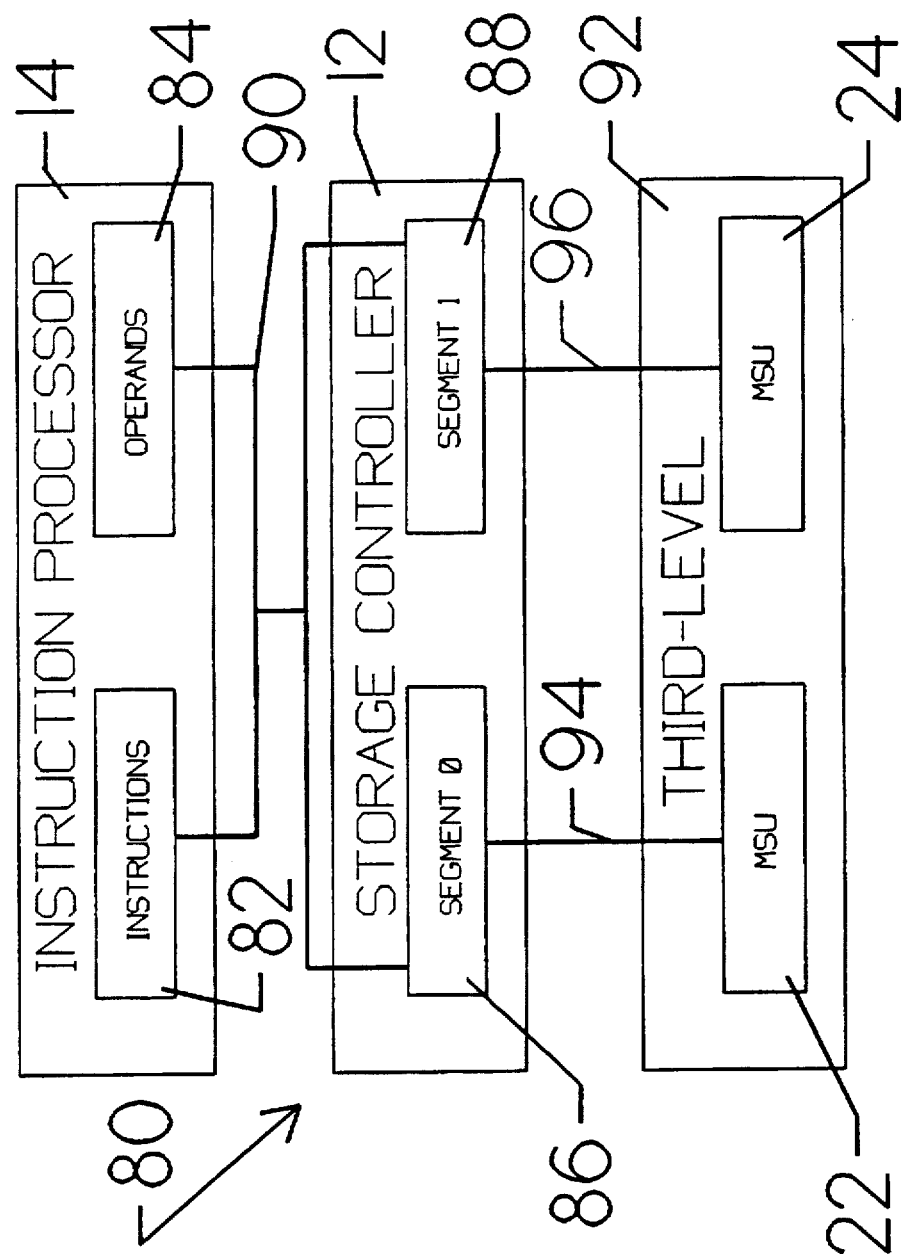
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8k of 36-bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36-bit words containing the desired data element. A more detailed explanation of the operation of instruction cache 82 and operand cache 84 is found below.

Storage controller 12 contains an intermediate level cache segment of 128k 36-bit words for each main memory module within the cluster. In the present illustration, storage controller 12 contains segment 0 cache 86, and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also, FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
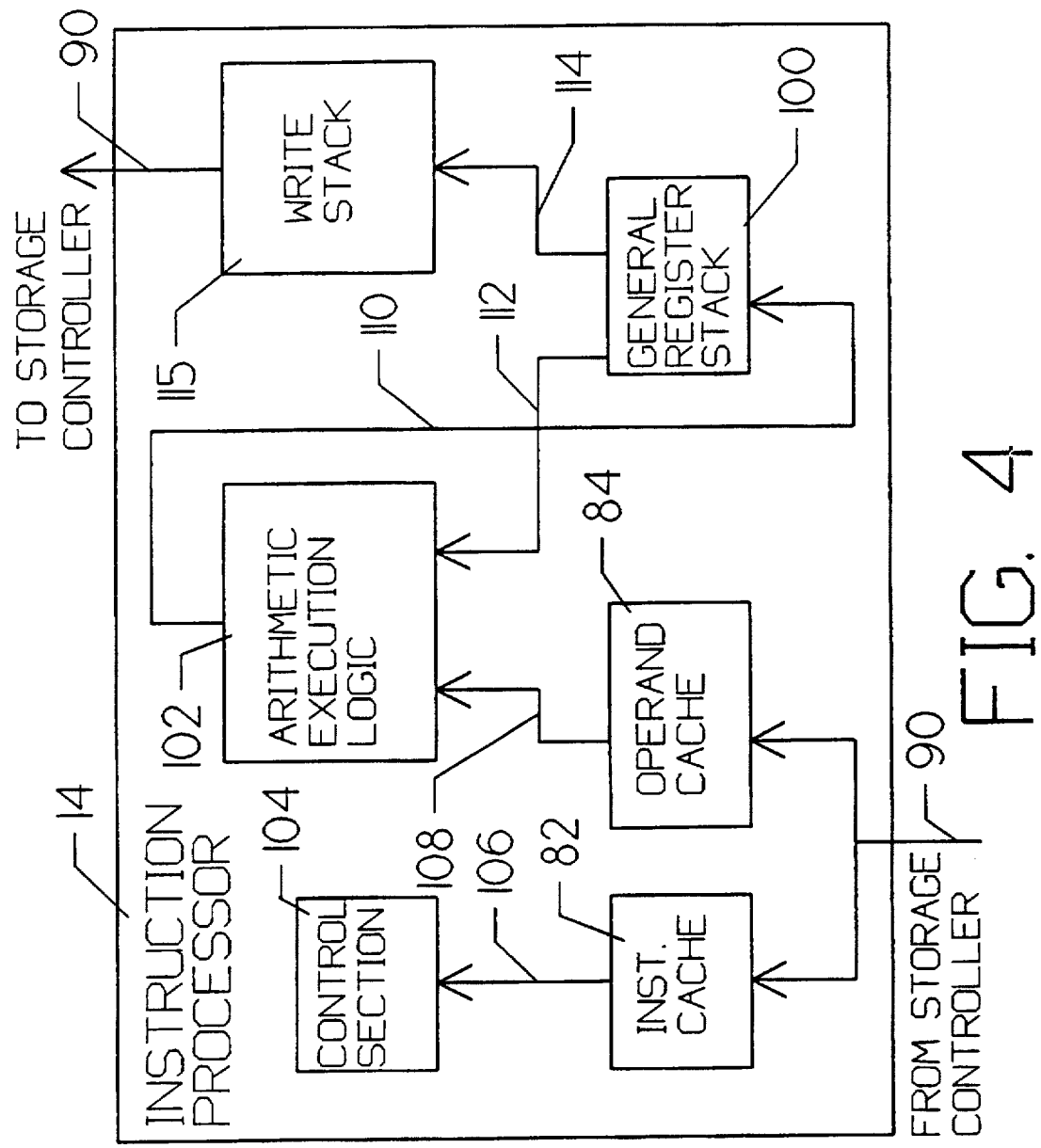
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. Arithmetic execution logic 102 receives operand data via path 108 and performs the specified operation using a combination of microcode control and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
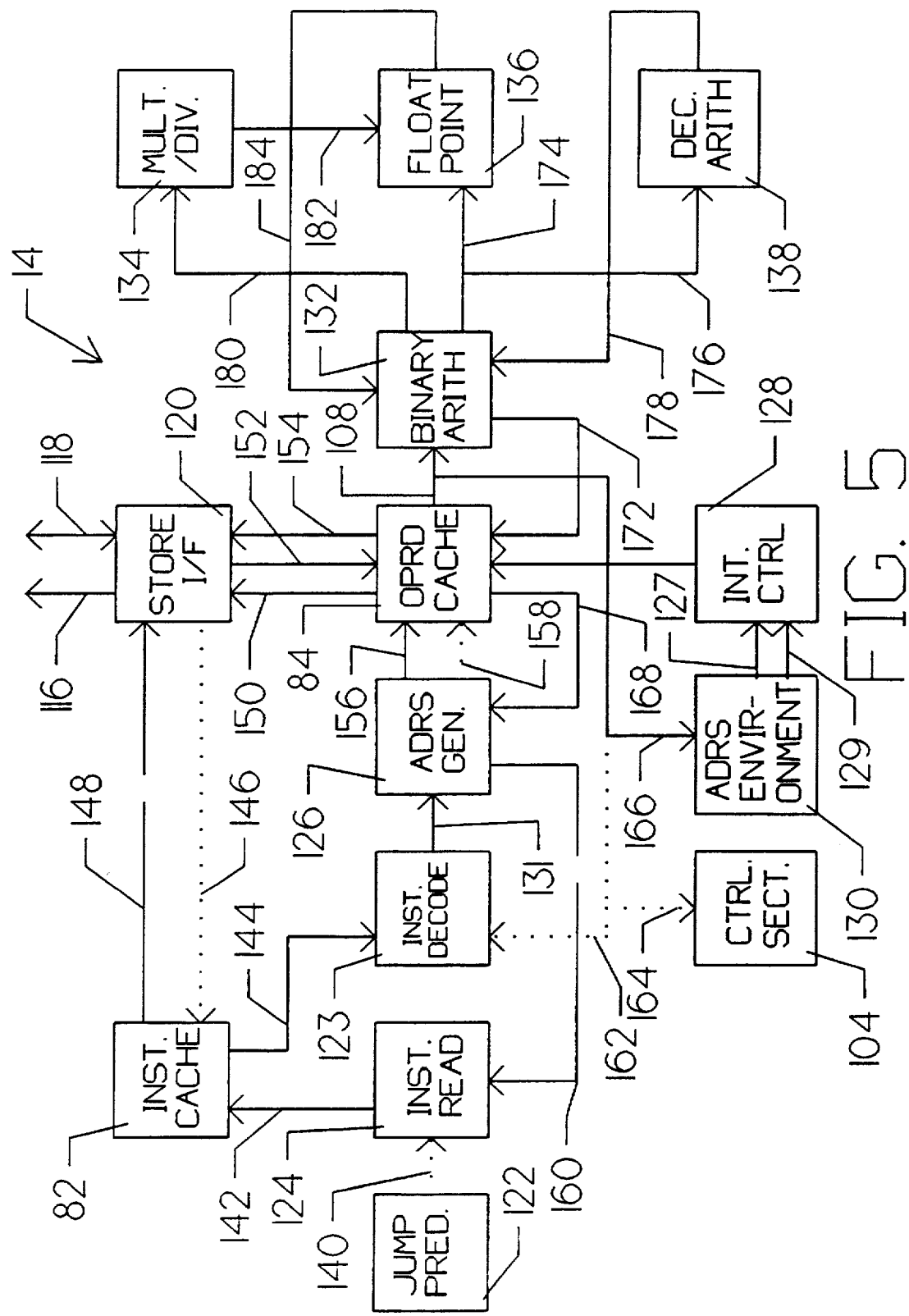
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72-bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36-bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130. If the instruction is the next sequential instruction, its address is determined by incrementing the program address counter. If the instruction to be executed is addressed by a branch or jump instruction, the address may be computed by address generator 126 and supplied via path 160. Alternatively, the address may be supplied by jump prediction 122 via path 140 during operation in the jump prediction mode as explained in detail below. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register stack 100 (see also, FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions involves a change to the base registers within the addressing environment 130. The data is supplied to addressing environment 130 via path 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. The preferred mode utilizes a three stage pipeline. The timing of this pipelined operation may be found below and in U.S. patent application Ser. No. 07/762,276, now abandoned entitled "Data Coherency Protocol for Multi-Level Cached High Performance Multiprocessor System", referenced co-pending application which has been incorporated herein by reference. The remaining referenced components are as previously discussed.

Figure 6:
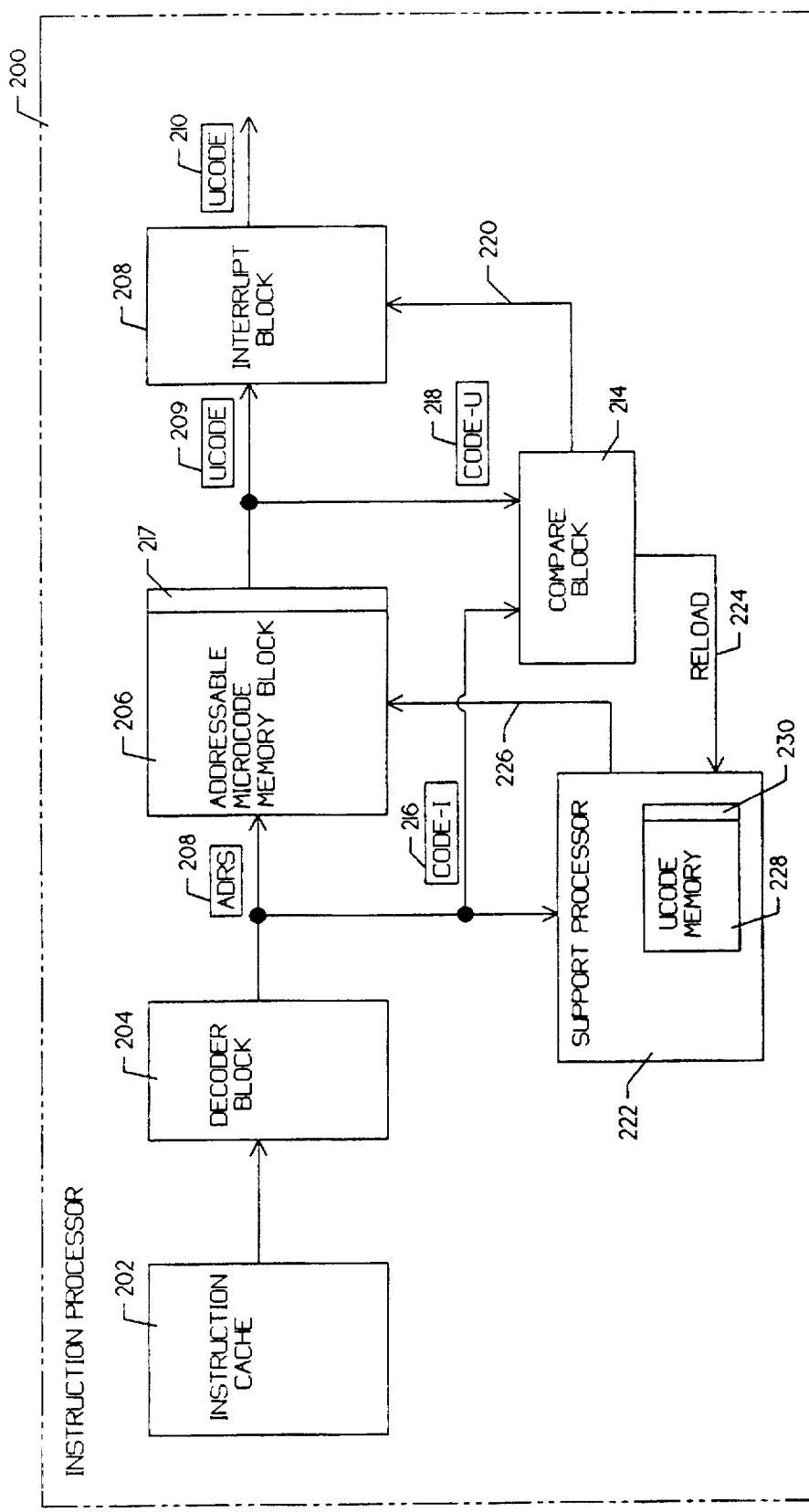
FIG. 6 is a block diagram showing a first illustrative instruction processor for executing instructions, wherein the instruction processor includes an addressable microcode memory block that only stores a subset of the microcode instruction set therein.

FIG. 6 is a block diagram showing a first illustrative instruction processor 200 for executing instructions, wherein the instruction processor includes an addressable microcode memory block 206 that only stores a subset of the microcode instruction set therein. This embodiment recognizes that in some cases, it may be desirable to reduce the size of the microcode memory to conserve valuable printed circuit board real estate.

In the illustrative embodiment, the instruction processor 200 includes an instruction cache 202, a decode block 204, an addressable memory block 217, a compare block 214, and an interrupt block 208. A support processor 222 may be part of the instruction processor as shown, or may be separate element.

The instruction cache 202 sequentially provides instructions to the decoder block 204 during instruction execution. The decoder block 204 then decodes each instruction, and provides a decoded address to the addressable memory block 206. The addressable memory block 206 reads the corresponding address location, and provides a corresponding microcode instruction 209, as shown. In a preferred embodiment, the addressable memory block 206 may be a RAM.

To reduce the size of the addressable memory block 206, not all of the microcode instructions may be stored therein. Rather, only a subset, or group, of microcode instructions may be stored in the addressable memory block 206. If an instruction provided by the decoder block 204 references a microcode instruction that is not currently stored in the addressable memory block 206, the support processor 222 or the like may be notified and the desired microcode instruction may be written, or paged, from the support processor 222 into the addressable memory block 206 via interface 226. Thereafter, instruction execution may continue.

To control the microcode paging function, it is contemplated that the microcode instructions may be divided into a number of groups. Each group of microcode instructions may support a selected instruction or group of instructions. To designate the groups, the addressable microcode memory block 206 may store a group code 217 for each microcode instruction, wherein the group code indicates the instructions that are supported thereby. Likewise, the decoder block 204 may provide a corresponding group code 216 for each instruction.

Because the addressable memory block 206 only stores a group of microcode instructions, and not all of the microcode instructions, it is often necessary to determined whether the group of microcode instructions stored in the addressable memory block 206 support the current instruction provided by the decoder block 204. In the illustrative embodiment, a compare block 214 is provided for comparing the group code 216 provided by the decoder block 204 with the group code 218 provided by the corresponding microcode instruction. If the group codes match, the microcode instruction is deemed to support the instruction provided by the decoder block 204, and the execution of the microcode instruction may continue.

When a desired microcode instruction is not found in the addressable memory block 206, as indicated by a mismatch between group codes 216 and 218, the compare block 214 notifies the support processor 222 to load the addressable memory block 206 with the desired microcode instruction. To assist in the identification of the desired microcode instruction, it is contemplated that the compare block 214 may provide the group code 216 provided by the decoder block 204 to the support processor 222. The support processor 222 may then identify the desired microcode instruction by comparing the group code 216 with locally stored group codes 230 that are stored in a local microcode memory 228.

A number of loading methods are contemplated. First, only the desired microcode instruction may be loaded into the addressable microcode memory block 216. Alternatively, an entire group of microcode instructions may be transferred to the addressable memory block 206. Finally, it is contemplated that only the most commonly used microcode instructions may be stored in the addressable memory block 206, and when an instruction is encountered that requires another microcode instruction, the correct microcode instruction may be written to the addressable memory block 206. Thereafter, the group of commonly used microcode instructions are again written back to the addressable memory block 206.

Finally, the compare block 214 may provide an interrupt signal 220 to interrupt block 208. The interrupt block 208 may interrupt the execution of the instruction processor 200 while a microcode instruction or a group of microcode instructions are loaded from the support processor 222 to the addressable memory block 206. The interrupt block 208 may also provide a number of other interrupt signals to the data processing system (not shown) to interrupt various other hardware sequences within the machine.

Figure 7:
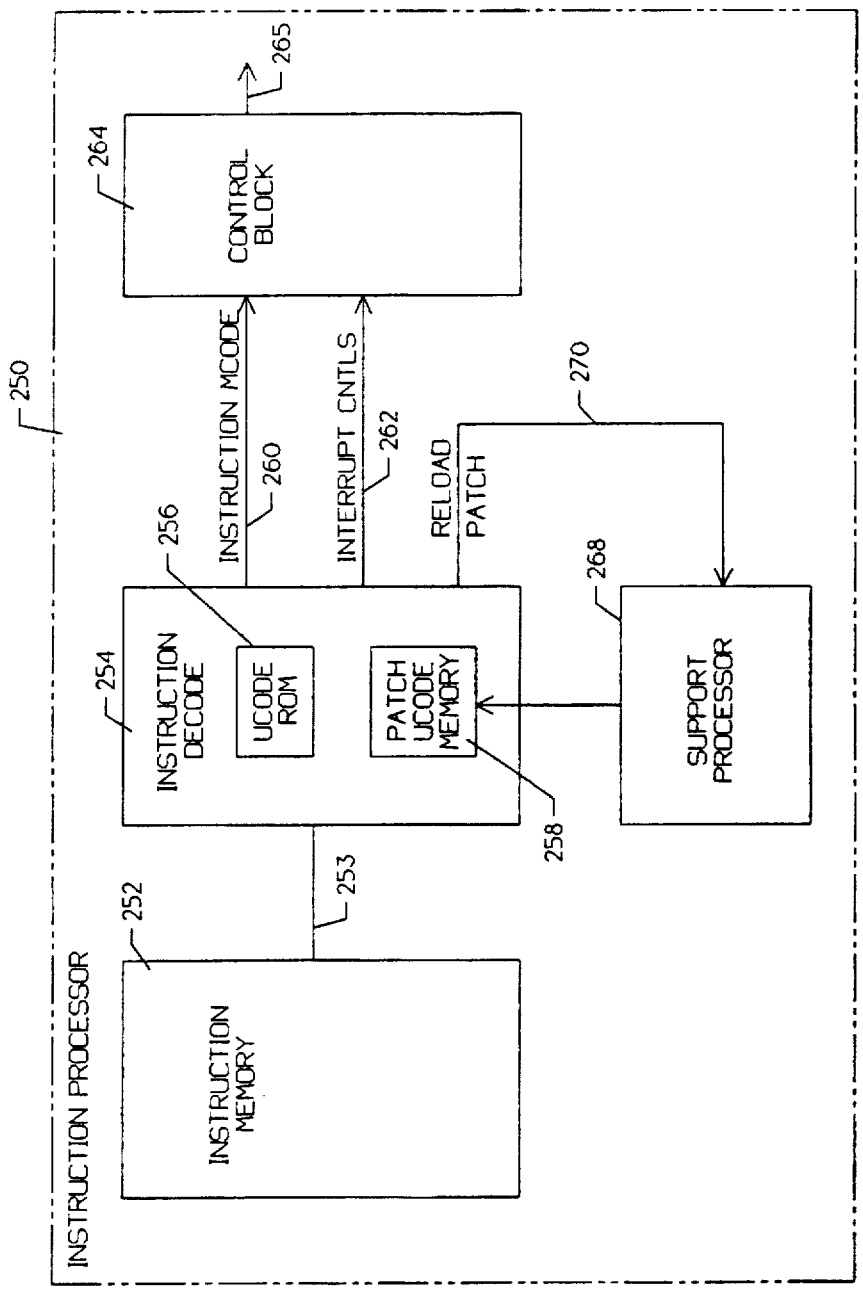
FIG. 7 is a block diagram showing a second illustrative instruction processor for executing instructions, wherein the instruction processor includes a microcode ROM and a microcode RAM.

FIG. 7 is a block diagram showing a second illustrative instruction processor 250 for executing instructions. The instruction processor 250 includes an instruction memory 252, an instruction decode block 254, a control block 264, and a support processor 268. The instruction decode block 254 includes a microcode ROM 256 and a microcode RAM 258, as shown. It is contemplated that the support processor 268 may be in the instruction processor 250, or may be a separate element.

The instruction memory 252 sequentially provides instructions to the instruction decode block 254 during instruction execution. The instruction decode block 254 then decodes each instruction, and provides a decoded instruction address to the microcode RAM 258 and microcode ROM 256. The microcode ROM 256 may store the current release of the microcode for the computer system, and the microcode RAM 258 may store microcode patch instructions. The microcode RAM 258 and microcode ROM 256 read the corresponding address locations, and each provided a corresponding microcode instruction. The present invention may then select between the output of the microcode ROM 256 and the microcode RAM 258, depending on whether the instruction requires a patch microcode instruction.

If an instruction does not require a microcode patch instruction, the instruction decode block 254 provides the microcode instruction read from the microcode ROM 256 to the control block 264. The control block 264 may then provide control signals 265 to control the major data paths and control points throughout the data processing system. If an instruction does require a microcode patch instruction, the instruction decode block 254 provides the microcode patch instruction read from the microcode RAM 258 to the control block 264. Again, the control block 264 may provide control signals 265 to control the major data paths and control points throughout the data processing system.

Because a RAM typically is more expensive, uses more power, and uses more printed circuit board space than a ROM, it is often desirable to maximize the use of ROMs and minimize the use and size of RAMs. To minimize the size of the microcode RAM 258, it is contemplated that not all of the microcode patch instructions may be stored therein. Rather, only a subset, or group, of microcode patch instructions may be stored in the microcode RAM 258. If an instruction requires a patch instruction that is not currently stored in the microcode RAM 258, a support processor 268 or the like is notified and the desired microcode patch instruction may be written, or paged, into the microcode RAM 258 therefrom. During the instruction paging, it is contemplated that the instruction decode block 254 may provide interrupt control signals to the control block 264 via interface 262 (as well as other blocks within the system) to interrupt the execution of the data processing system. Thereafter, the new microcode instruction read from the reloaded microcode RAM 258 may be provided to the control block 264, and instruction execution may continue. This may conserve valuable printed circuit board and RAM resources.

The present invention provides an ideal environment for debugging a circuit design or computer system. The main microcode may be provided in the microcode ROM 256. The microcode patch instructions, which may be used to overcome hardware errors within the system, may be stored in the microcode RAM 258. This may allow the computer system to continue to operate after a hardware error is detected, by simply loading new microcode patch instructions into the microcode RAM 258.

After final verification of the system is complete, the hardware errors may be physically corrected, and the instructions in the microcode RAM 258 may no longer be needed. However, and because hardware errors may be detected by the end users after the computer system is released, the microcode RAM 258 may still provide a location for storing microcode patch instructions. Thus, the microcode RAM may allow the computer system to continue to operate by simply providing new microcode patch instructions to the end users, rather than replacing the microcode ROM 256 or making some other physical modification to the system.

Figure 8:
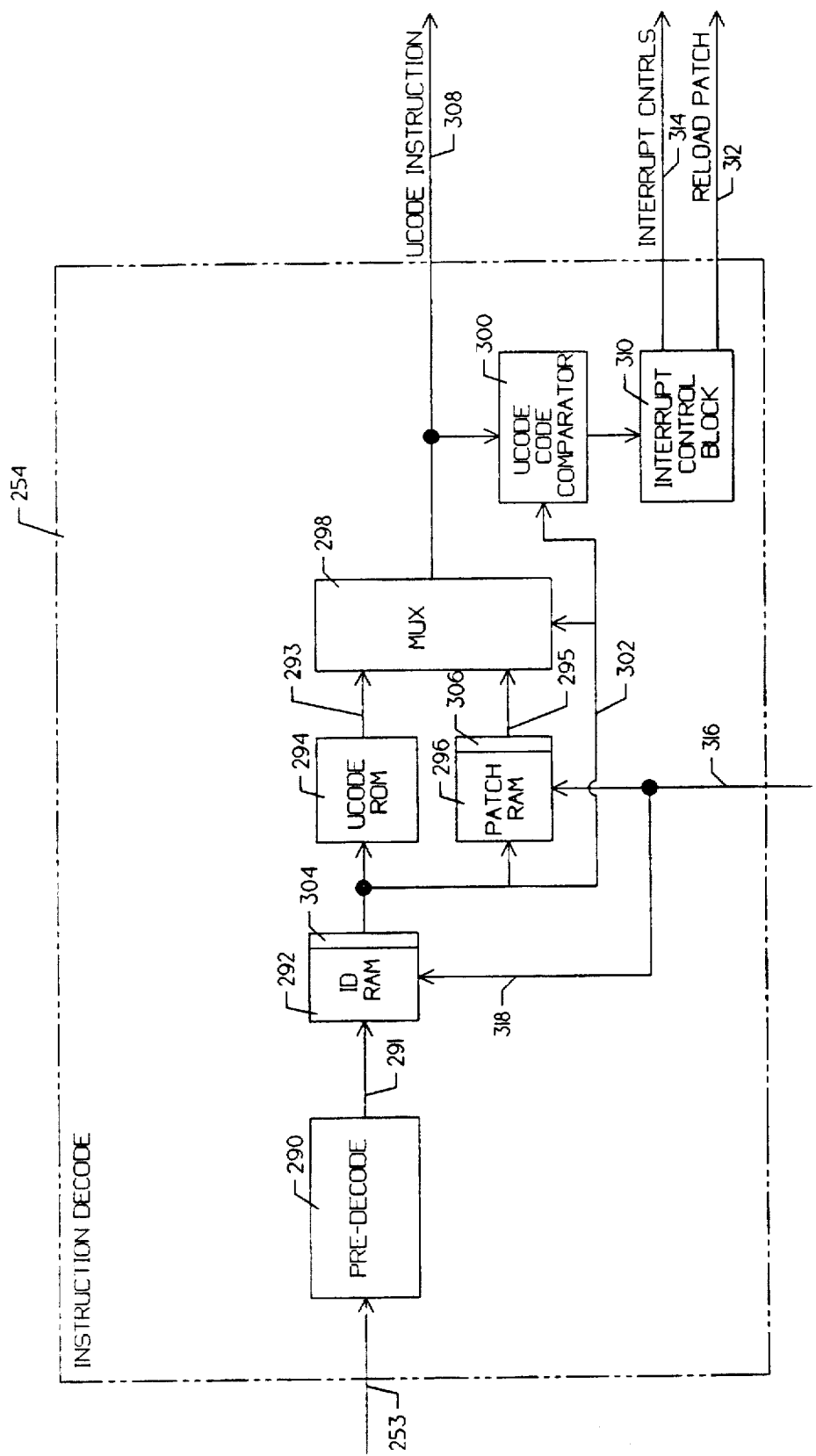
FIG. 8 is a detailed block diagram showing the instruction decode block of FIG. 7.

FIG. 8 is a detailed block diagram showing the instruction decode block of FIG. 7. The instruction decode block 254 includes a pre-decode block 290, an instruction decode (ID) RAM 292, a microcode RAM 296, a microcode ROM 294, a multiplexer 298, a microcode patch comparator 300, and an interrupt control block 310. The instruction memory 252 (see FIG. 7) sequentially provides instructions to the pre-decode block 290 via interface 253 during instruction execution. The pre-decode block 290 then decodes each instruction, and provides an instruction address to the microcode ID RAM 292, along with other control signals to other parts of data processing system. The ID RAM 292 decodes the instruction address by using a table look-up algorithm, and provides a decoded address to the microcode RAM 296 and microcode ROM 294 via interface 302. The microcode RAM 296 and microcode ROM 294 read the corresponding address locations, and each provided a corresponding microcode instruction on interfaces 295 and 293, respectively. The multiplexer 298 selects which of the instructions to execute. If the current instruction provided on interface 302 does not require a microcode patch, the multiplexer 298 selects the output of the microcode ROM 294. If, however, the current instruction requires a microcode patch, the multiplexer selects the output of the microcode RAM 296.

Because a RAM typically is more expensive, uses more power, and uses more printed circuit board space than a ROM, it is often desirable to maximize the use of ROMs and minimize the use and size of RAMs. To minimize the size of the microcode RAM 296, it is contemplated that not all of the microcode patch instructions may be stored therein. Rather, only a subset, or group, of microcode patch instructions may be stored in the microcode RAM 296. If an instruction requires a patch instruction that is not currently stored in the microcode RAM 296, a support processor 268 (see FIG. 7) or the like may be notified and the desired microcode patch instruction may be written, or paged, into the microcode RAM 296. Thereafter, instruction execution may continue. This may conserve valuable printed circuit board and RAM resources.

It is contemplated that the number of microcode patch instructions may be divided into a number of groups. Each group of microcode patch instructions may support a selected instruction or group of instructions. To designate the groups, the microcode RAM 296 may store a group code 306 for each microcode patch instruction, wherein the group code indicates the instructions that are supported thereby.

Because the microcode RAM 296 may only store a subset of microcode patch instructions, and not all of the microcode patch instructions, it is desirable to determined whether the subset of microcode patch instructions stored in the microcode RAM 296 support the current instruction provided by the ID RAM 292. In a preferred embodiment, this is accomplished by the microcode code comparator 300, which compares a group code 304 provided by the ID RAM 292 on interface 302 with the group code 306 provided by the microcode RAM on interface 308. If the group codes match, the microcode patch instruction is deemed to support the instruction provided by the ID RAM 292, and the execution of the microcode patch instruction may continue.

As indicated above, when a desired microcode patch instruction is not found in the microcode RAM 296, as indicated by a mismatch between group codes 304 and 306, the microcode RAM 296 must be loaded with the desired microcode patch instruction. In a first illustrative embodiment, it is contemplated that only the desired microcode patch instruction may be loaded into the microcode RAM 296. Alternatively, it is contemplated that an entire group of patch instructions may be transferred to the microcode RAM 296. Finally, it is contemplated that only the most common patch instructions may be stored in the microcode RAM, and when an instruction is encountered that requires another microcode patch instruction, the correct microcode patch instruction may be written to the microcode RAM.

Thereafter, the group of common patch instructions may again be written back to the microcode RAM.

It is contemplated that the ID RAM 292 may provide a CS RAM SELECT bit to the select input of multiplexer 298 via interface 302. The CS RAM SELECT bit may select between the microcode instruction provided by the microcode ROM 294 and the microcode patch instruction provided by the microcode RAM 296. If an instruction does not require a microcode patch, the CS RAM SELECT bit may cause multiplexer 298 to select the output of the microcode ROM 294. If, however an instruction does require a microcode patch (e.g. because of a hardware error, etc.), the CS RAM SELECT bit may cause the multiplexer 298 to select the output of the microcode RAM 296. By providing a group code 304 and a CS RAM SELECT bit, the ID RAM 292 may correctly deliver the appropriate microcode instruction 308 to the data processing system.

It is contemplated that the ID RAM 292 may be periodically updated from support controller 268 via interface 318. This may most often occur when a new hardware error is detected, and one of the instructions requires a new microcode patch instruction. For example, the CS RAM SELECT bit may have to be set for a corresponding address in the ID RAM 292 to properly select a desired microcode patch instruction from the microcode RAM 296, rather than a microcode instruction from the microcode ROM 294.

Finally, it is contemplated that the interrupt block 310 may interrupt the execution of the instruction processor 254 while a microcode patch instruction or a group of microcode patch instructions are loaded into the microcode RAM 296 from the support processor 268. The interrupt block 310 may also initiate the reloading of the microcode RAM 296, as described above.

Figure 9:
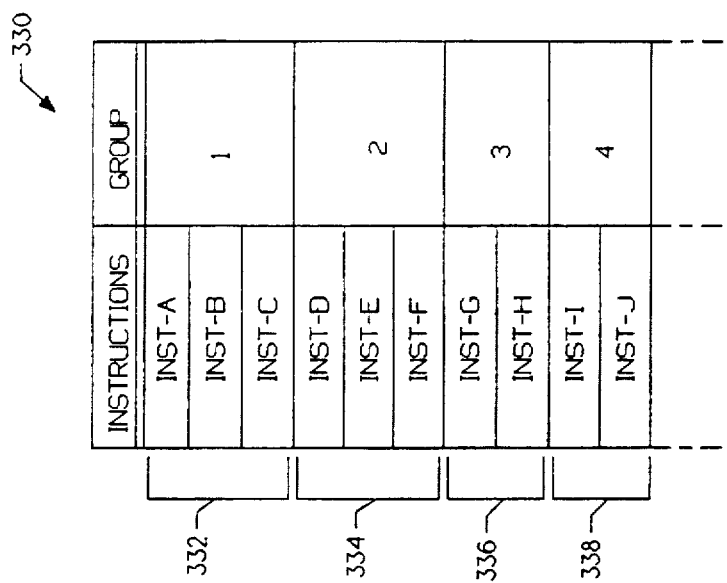
FIG. 9 is a table showing illustrative groups of decoded instructions that may be stored in the ID RAM, and the corresponding group codes therefor.

FIG. 9 is a table showing illustrative groups of decoded instructions that are stored in the ID RAM, and the corresponding group codes therefor. The table is generally shown at 330. A first group of instructions is shown at 332, as indicated by the group "1" designation. The first group of instructions includes INST-A, INST-B and INST-C. The instructions may be grouped according to function, or any other criteria. A second group of instructions is shown at 334, as indicated by the group "2" designation. The second group of instructions includes INST-D, INST-E and INST-F. A third group of instructions is shown at 336, as indicated by the group "3" designation. The third group of instructions includes INST-G and INST-H. Finally, a fourth group of instructions is shown at 338, as indicated by the group "4" designation. The fourth group of instructions includes INST-I and INST-J.

Figure 10:
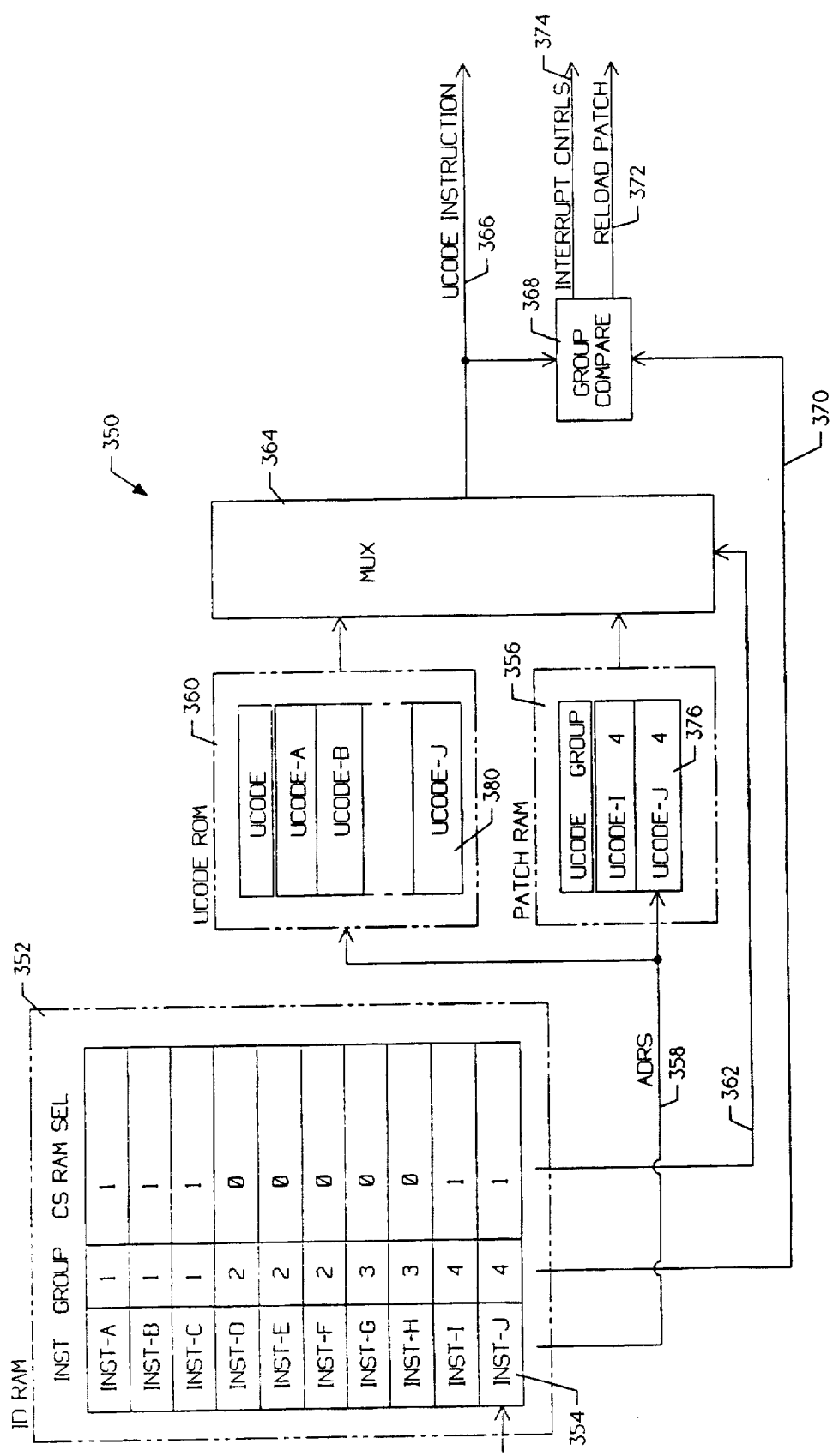
FIG. 10 is a block diagram showing the operation of the illustrative instruction processor of FIG. 8, wherein the desired microcode instruction is already stored in the microcode RAM.

FIG. 10 is a block diagram showing the operation of the illustrative instruction processor of FIG. 8, wherein a desired microcode patch instruction is already stored in the microcode RAM. The ID RAM 352 may store an entry for each instruction in an instruction set, as shown. For each instruction, the ID RAM 352 may store an instruction address (e.g. INST-A), a group code and a CS RAM SELECT bit, as shown. During instruction execution, a number of instructions are sequentially provided to the ID RAM 352, as described above. Each instruction may provide, or may be decoded to provide, an address to ID RAM 352 to select a corresponding instruction entry. In the illustrative embodiment, an INST-J provides an address to select the corresponding INST-J entry 354 in the ID RAM 352. The INST-J entry 354 in the ID RAM 352 includes an "INST-J" address, a group code of "4", and a CS RAM SELECT bit of "1". The CS RAM SELECT bit indicates that a patch instruction is required for the INST-J instruction, and is provided to multiplexer 364.

The INST-J address is provided to both the microcode ROM 360 and the microcode RAM 356, as shown. The microcode ROM 360 reads the contents at the INST-J address, or in this case, the microcode for INST-J, as shown at 380. Likewise, the microcode RAM 356 reads the contents of the INST-J address, or in this case, the microcode for INST-J, as shown at 376. Note that in this example, the microcode patch instruction 376 is already stored in the microcode RAM 356.

As indicated above, the CS RAM SELECT bit is provided to the multiplexer 364 via interface 362. Since the CS RAM SELECT bit is set to "1", the multiplexer 364 selects the output of the microcode RAM 356, and provides the microcode patch instruction to the microcode instruction output 366. The microcode RAM 360 also provides a group code to the microcode instruction output 366, or in this case, a group code is "4".

The compare block 368 compares the group code provided by the microcode RAM 356 and the group code provided by the ID RAM 352. In the illustrative embodiment, the group codes match, and therefore the microcode patch instruction (UCODE-J) is deemed to support the current instruction (INST-J). Thus, the compare block 368 does not initiate an interrupt via interface 374 or a microcode RAM reload via interface 372, and the instruction is executed.

Figure 11:
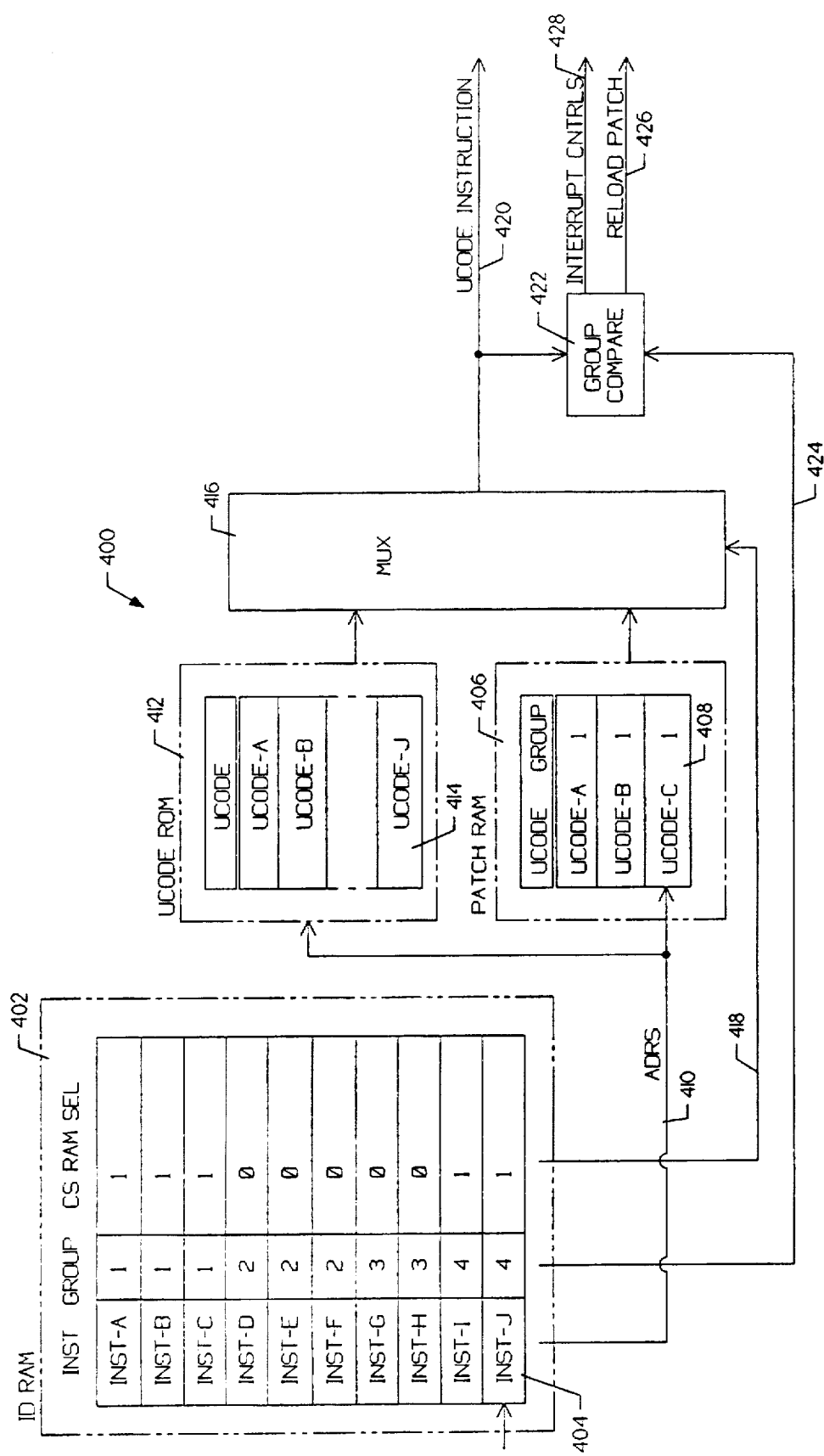
FIG. 11 is a block diagram showing the operation of the illustrative instruction processor of FIG. 8, wherein the desired microcode instruction must be loaded into the microcode RAM before instruction execution can continue.

FIG. 11 is a block diagram showing the operation of the illustrative instruction processor of FIG. 8, wherein a desired microcode patch instruction must be loaded into the microcode RAM before instruction execution can continue. In the illustrative embodiment, an instruction (INST-J) provides an address to select the corresponding INST-J entry 404 in the ID RAM 402. The INST-J entry 404 in the ID RAM 402 includes an "INST-J" address, a group code of "4", and a CS RAM SELECT bit of "1", just as in FIG. 10. The CS RAM SELECT bit indicates that a patch instruction is required for the INST-J instruction.

The INST-J address is provided to both the microcode ROM 412 and the microcode RAM 406, as shown. The microcode ROM 412 reads the contents at the INST-J address, or in this case, the microcode for INST-J, as shown at 414. Likewise, the microcode RAM 406 read the contents at the INST-J address, or in this case, the microcode for INST-C, as shown at 408. Note that in this example, the correct microcode patch instruction INST-J is not stored in the microcode RAM 356. Rather, a microcode patch instruction for INST-C is stored at the corresponding address, as shown at 408.

The CS RAM SELECT bit is provided to the multiplexer 416 via interface 418. Since the CS RAM SELECT bit is set to "1", the multiplexer 416 selects the output of the microcode RAM 406, and provides the microcode patch instruction "INST-C" to the microcode instruction output 420. The microcode RAM 406 also provides a group code to the microcode instruction output 420, or in this case, a group code is "1".

The compare block 422 compares the group code provided by the microcode RAM 406 and the group code provided by the ID RAM 402. In the illustrative embodiment, the group codes do not match, and therefore the microcode patch instruction (UCODE-C) is deemed to not support the current instruction (INST-J). The compare block 422 then initiates an interrupt via interface 428 and a microcode RAM reload via interface 426. It is contemplated that the compare block 422 may provide the group code provided by the ID RAM 402 to a support processor or the like. This group code may be used by the support processor to identify which microcode patch instructions to load into the microcode RAM 406.

Figure 12:
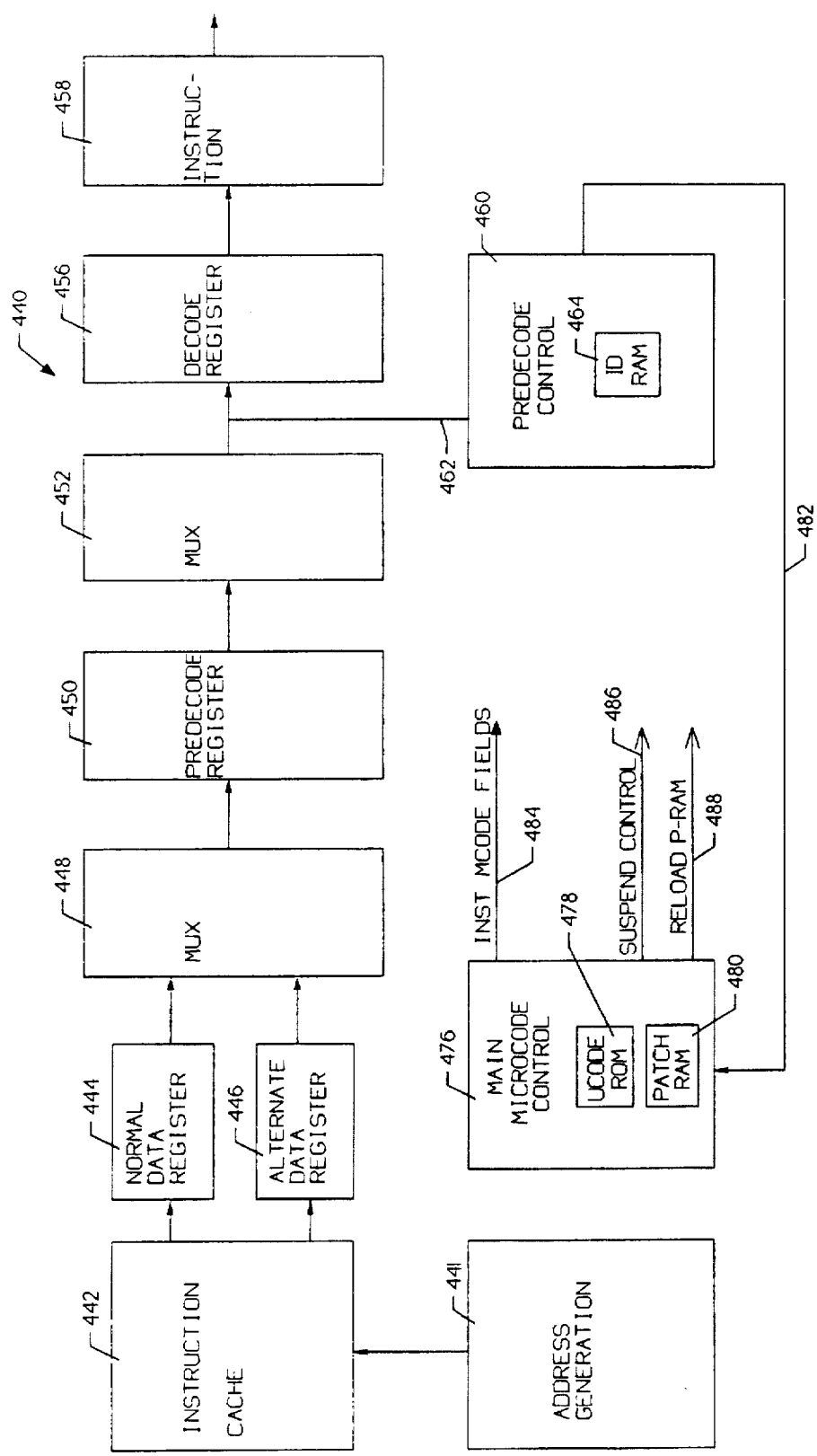
FIG. 12 is a block diagram showing a preferred implementation of the instruction processor.

FIG. 12 is a block diagram showing a preferred implementation of the instruction processor in accordance with the present invention. The instruction processor is shown generally at 440. The operation of the instruction processor is generally described below. For instructions not causing a branch (i.e. during normal machine operation with no redirection occurring) or for non-conditional redirection instructions, an instruction address is provided by address generator 441 to instruction cache 442. A 36-bit machine instruction is provided by the instruction cache 442, and is staged in normal data register 444. Only conditional jump instructions are staged in alternate data register 446. The instruction is clocked through multiplexer 448 to predecode register 450, wherein predecode register 450 initiates a number of control lines (not shown) to provide an early look at the fetched instruction for other logic blocks within the instruction processor. Selected fields of the 36-bit machine instruction are decoded to a 9-bit address and clocked through multiplexer 452 to decode register 456 and to predecode control 460 via interface 462. The instruction decode block 458 further decodes the instruction, including a microcode instruction provided by main microcode control block 476 (see below).

The predecode control 460 may include an instruction decode (ID) RAM 464, as described above, wherein the 9-bit address selects a corresponding entry therein. The ID RAM 464 may send a corresponding 9-bit decoded address to the main microcode control 476 via path 482. In the present embodiment, main microcode control 476 includes a microcode ROM 478 and a microcode RAM 480, as described above. The 9-bit decoded address selects one of 512 locations within the microcode ROM 478. Likewise, the 9-bit decoded address selects one of the locations in the microcode RAM 480. The microcode ROM 478 and the microcode RAM 480 provide a corresponding microcode instruction and a corresponding microcode patch instruction, respectively.

A selector block (see FIG. 13) selects the output of either the microcode ROM 478 or the microcode RAM 480, and provides the resulting microcode instruction to the instruction decode block via interface 484. Main microcode control 476 also provides a number of interrupt control signals via interface 486 to selected points in the data processing system to interrupt the execution thereof if a microcode patch instruction is not currently stored in the microcode RAM 480 (see FIG. 13). A further discussion of the construction and operation of the instruction processor shown in FIG. 12 can be found in U.S. patent application Ser. No. 08/686,258, filed Jul. 25, 1996, entitled "REDIRECT CONTROL FOR AN INSTRUCTION PROCESSOR", which has been incorporated herein by reference.

Figure 13:
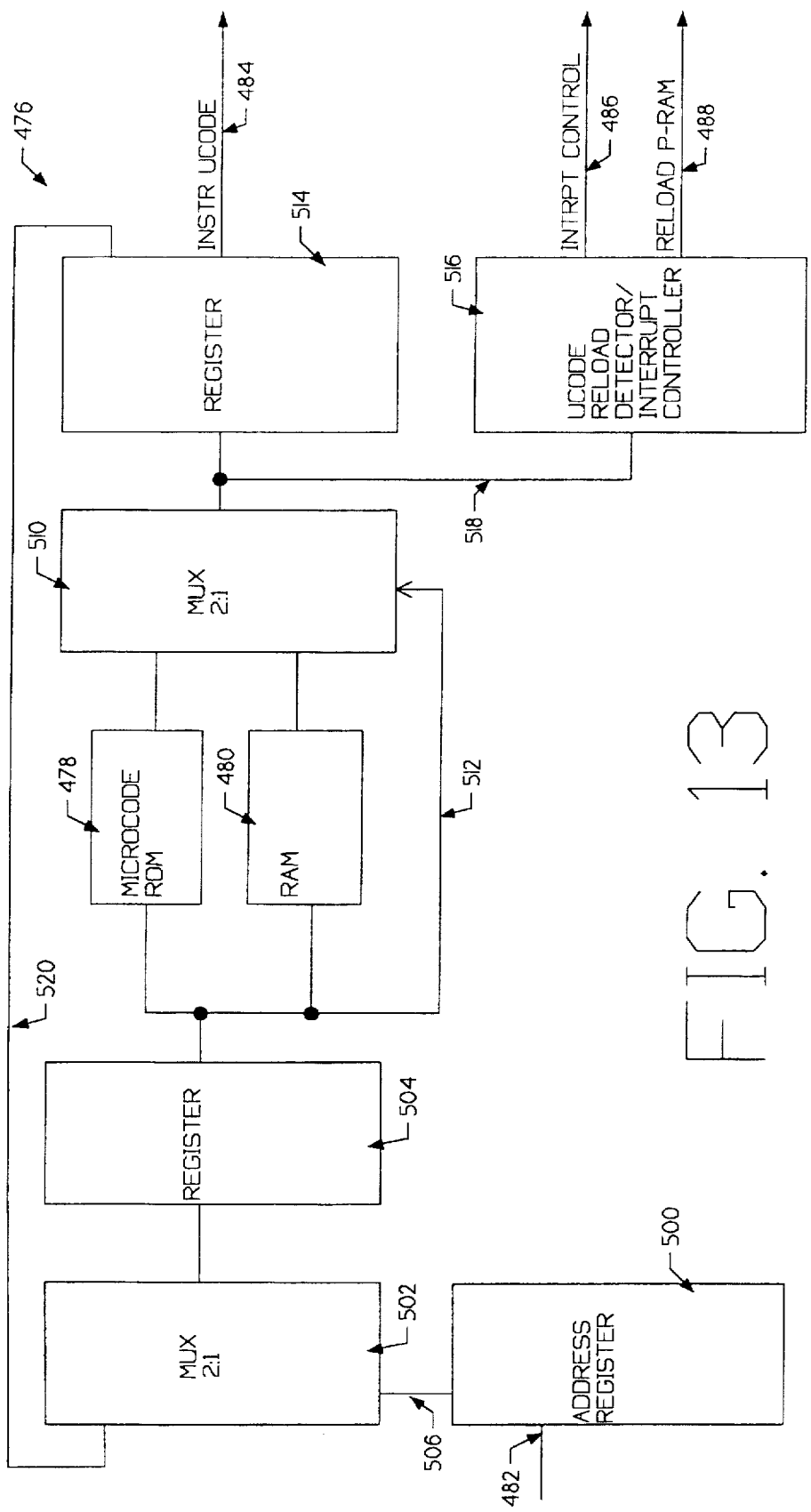
FIG. 13 is a block diagram showing a preferred implementation of the main microcode control block of FIG. 12.

FIG. 13 is a block diagram showing a preferred implementation of the main microcode control block of FIG. 12. Predecode control 460 (see FIG. 12) sends a 9-bit decoded microcode address to address register 500 via path 482. Address register 432 provides the decoded microcode address to multiplexer 502 via path 506, wherein a 2:1 selection is performed. This selection allows the microcode address to be initially clocked through register 504 to microcode ROM 478 and microcode RAM 480. Microcode ROM 478 and microcode RAM 480 utilize the decoded microcode address to select a corresponding microcode instruction and a corresponding microcode patch instruction, respectively. A multiplexer 510 selects which of the instructions to execute. If the current instruction does not require a microcode patch instruction, the multiplexer 510 selects the output of the microcode ROM 478. If, however, the current instruction requires a microcode patch instruction, the multiplexer 510 selects the output of the microcode RAM 480.

Because a RAM typically is more expensive, uses more power, and uses more printed circuit board space than a ROM, it is often desirable to maximize the use of ROMs and minimize the use and size of RAMs. To minimize the size of the microcode RAM 480, it is contemplated that not all of the microcode patch instructions may be stored in the microcode RAM 480. Rather, only a subset, or group, of microcode patch instructions may be stored therein. If an instruction requires a microcode patch instruction that is not currently stored in the microcode RAM 480, a support processor 268 (not shown) or the like may be notified and the desired microcode patch instruction may be written, or paged, into the microcode RAM 480, as described above. Thereafter, instruction execution may continue. This may conserve valuable printed circuit board and RAM resources.

It is contemplated that the number of microcode patch instructions may be divided into a number of groups. Each group of microcode patch instructions may support a selected instruction or group of instructions. To designate the groups, the microcode RAM 480 may store a group code for each microcode patch instruction, wherein the group code indicates the instructions that are supported thereby.

It is contemplated that the ID RAM 464 may also store a group code for each instruction entry, and predecode control 460 (see FIG. 12) may sends the corresponding group code to address register 500 via path 482. Because the microcode RAM 480 may only store a group of microcode patch instructions, and not all of the microcode patch instructions, it is desirable to determined whether the group of microcode patch instructions stored in microcode RAM 480 support the current instruction. In a preferred embodiment, this is accomplished by the microcode reload detector/interrupt controller block 516, which compares the group code provided by the ID RAM 464 with the group code provided by the microcode RAM 480. If the group codes match, the microcode patch instruction is deemed to support the current instruction, and the execution of the microcode patch instruction may continue.

As indicated above, when a desired microcode patch instruction is not found in the microcode RAM 480, the microcode RAM 480 must be loaded with the desired microcode patch instruction. In a first illustrative embodiment, it is contemplated that only the desired microcode patch instruction may be loaded into the microcode RAM 480. Alternatively, it is contemplated that an entire group of patch instructions may be transferred to the microcode RAM 480. Finally, it is contemplated that only the most common patch instructions may be stored in the microcode RAM 480, and when an instruction is encountered that requires another microcode patch instruction, the correct microcode patch instruction may be written to the microcode RAM 480. Thereafter, the group of common patch instructions may be written back to the microcode RAM 480.

It is also contemplated that the ID RAM 464 may store a CS RAM SELECT bit for each instruction entry, and predecode control 460 (see FIG. 12) may sends the corresponding group code to address register 500 via path 482. The CS RAM SELECT bit may be provided to the select input of multiplexer 510 via interface 512, for selecting between the microcode instructions provided by the microcode ROM 478 and the microcode RAM 480. If an instruction does not require a microcode patch, the CS RAM SELECT bit may cause multiplexer 510 to select the output of the microcode ROM 478. If, however, an instruction does require a microcode patch (e.g. because of a hardware error, etc.), the CS RAM SELECT bit may cause the multiplexer 510 to select the output of the microcode RAM 480. By providing a group code and a CS RAM SELECT bit, the appropriate microcode instruction may be delivered to the data processing system.

It is contemplated that the ID RAM 464 may be periodically updated from a support controller (not shown) or the like. This may most often occur when a new hardware error is detected, and one of the instructions requires a new microcode patch instruction. For example, the CS RAM SELECT bit may have to be set for a corresponding address in the ID RAM 464 to properly select a desired microcode patch instruction from the microcode RAM 480, rather than a microcode instruction from the microcode RAM 478.

Finally, it is contemplated that the microcode reload detector/interrupt block 516 may interrupt the execution of the instruction processor while a microcode patch instruction or a group of microcode patch instructions are loaded into the microcode RAM 480 from a support processor (not shown), or the like. The microcode reload detector/interrupt block 516 may also initiate the reloading of the microcode RAM 480 via interface 488, as described above.

A further discussion of the construction and operation of the instruction processor shown in FIG. 12 can be found in U.S. patent application Ser. No. 08/686,258, filed Jul. 25, 1996, entitled "REDIRECT CONTROL FOR AN INSTRUCTION PROCESSOR", which has been incorporated herein by reference.

Figure 14:
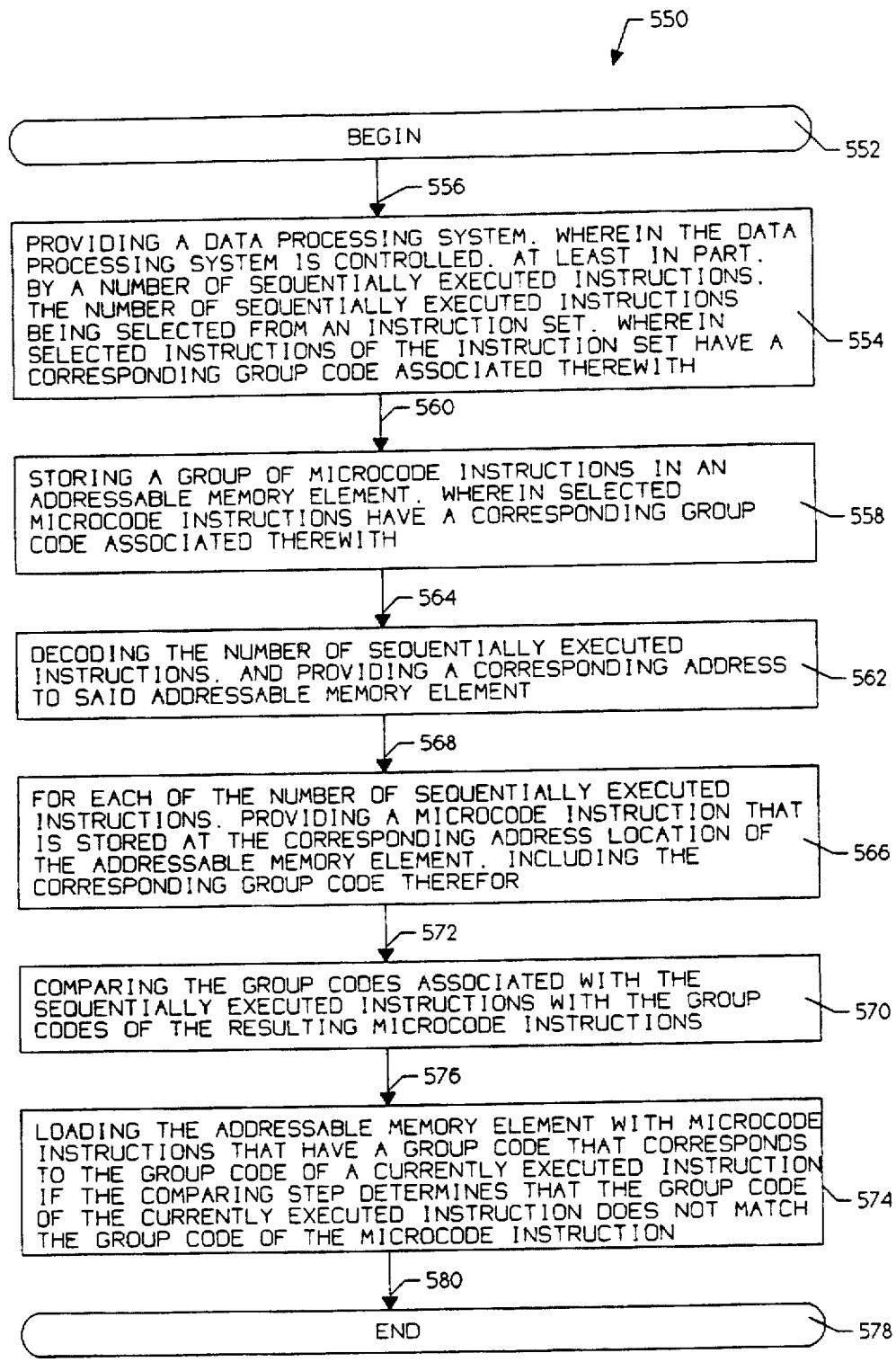
FIG. 14 is a flow diagram showing a first illustrative method of the present invention.

FIG. 14 is a flow diagram showing a first illustrative method of the present invention. The algorithm is generally shown at 550, and is entered at element 552. Control is passed to element 554 via interface 556. Element 554 provides a data processing system, wherein the data processing system is controlled, at least in part, by a number of sequentially executed instructions. The number of sequentially executed instructions is selected from an instruction set, wherein the selected instructions of the instruction set have a corresponding group code associated therewith. Control is then passed to element 558 via interface 560. Element 558 stores a group of micro instructions in an addressable memory element, wherein selected micro instructions have a corresponding group code associated therewith. Control is then passed to element 562 via interface 564. Element 562 decodes the number of sequentially executed instructions, and provides a corresponding address to the addressable memory element. Control is then passed to element 566 via interface 568. Element 566 provides a microcode instruction for each of the number of sequentially executed instructions. Each of the microcode instructions is read from the corresponding address location in the addressable memory element, including the corresponding group code therefore. Control is passed to element 570 via interface 572. Element 570 compares the group codes associated with the sequentially executed instructions with the group codes of the resulting microcode instructions. Control is passed to element 574 via interface 576. Element 574 loads the addressable memory element with microcode instructions that have a group code that corresponds to the group code of a currently executed instruction, if element 570 determines that the group code of the currently executed instruction does not match the group code of the microcode instruction. Control is then passed to element 578 via interface 580, wherein the algorithm is exited.

Figure 15:
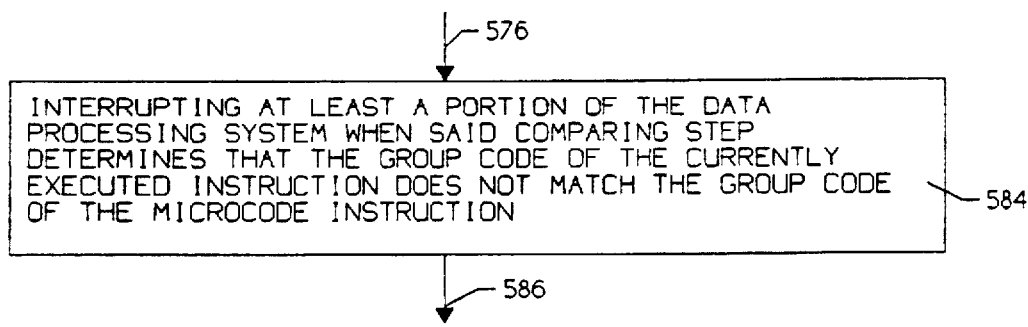
FIG. 15 is a flow diagram showing an additional interrupting step that may be included in the first illustrative method shown in FIG. 14.
Figure 16:
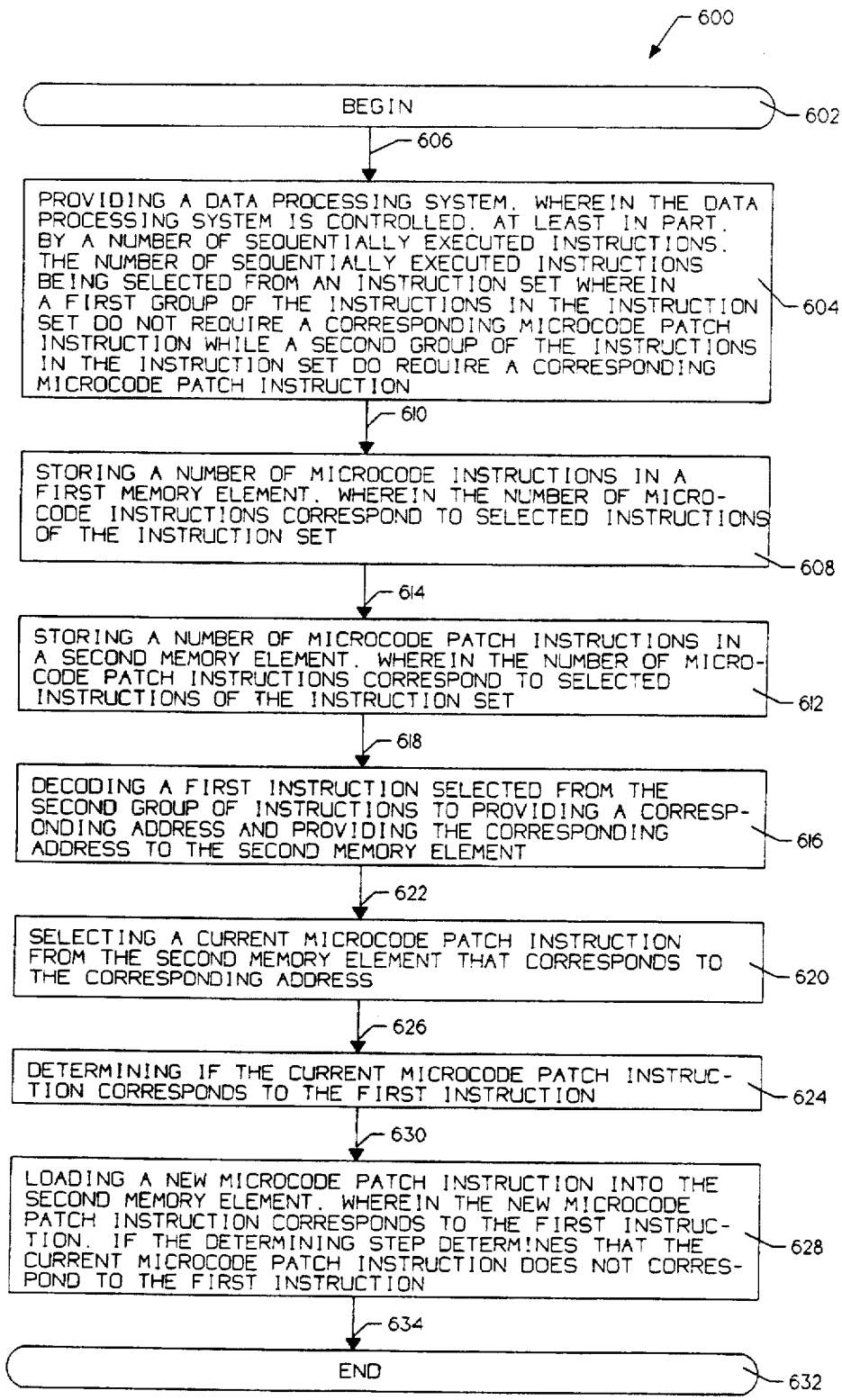
FIG. 16 is a flow diagram showing a second illustrative method of the present invention.

FIG. 15 is a flow diagram showing an additional interrupting step that may be included in the first illustrative method shown in FIG. 14. The interrupting step 584 may be provided between the comparing element 570 and the loading element 574 of FIG. 14. The interrupting step 584 interrupts at least a portion of the data processing system when the comparing element 570 of FIG. 14 determines that the group code of the currently executed instruction does not match the group code of the microcode instruction. |FIG. 16 is a flow diagram showing a second illustrative method of the present invention. The algorithm is generally shown at 600, and is entered at element 602. Control is then passed to element 604 via interface 606. Element 604 provides the data processing system that is controlled, at least in part, by a number of sequentially executed instructions. The number of sequentially executed instruction are selected from an instruction set, wherein a first group of the instructions in the instruction set do not require a corresponding microcode patch instruction, while a second group of the instructions in the instruction set do require a corresponding microcode patch instruction. Control is then passed to element 608 via interface 610. Element 608 stores a number of microcode instructions in a first memory element, wherein the number of microcode instructions correspond to selected instructions of the instruction set. Control is then passed to element 612 via interface 614. Element 612 stores a number of microcode patch instructions in a second memory element, wherein the number of microcode patch instructions correspond to selected instructions of the instruction set. Control is then passed to element 616 via interface 618. Element 616 decodes the first instruction selected from the second group of instructions to provide a corresponding address. The corresponding address is provided to the second memory element. Control is then passed to element 620 via interface 622. Element 620 selects a current microcode patch instruction from the second memory element that corresponds to the corresponding address. Control is then passed to element 624 via interface 626. Element 624 determines if the current microcode patch instruction corresponds to the first instruction. Control is then passed to element 628 via interface 630. Element 628 loads a new microcode patch instruction into the second memory element, wherein the new microcode patch instruction corresponds to the first instruction, if the determining step determines that the current microcode patch instruction does not correspond to the first instruction. Control is then passed to element 632 via interface 634, wherein the algorithm is exited.

Figure 17:
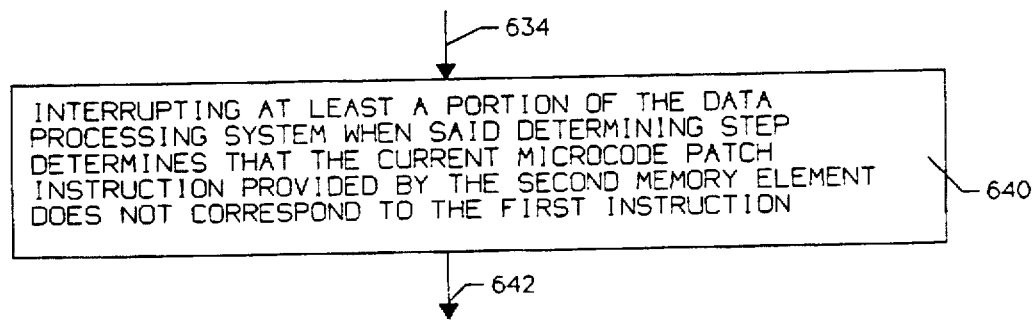
FIG. 17 is a flow diagram showing an additional interrupting step that may be included in the second illustrative method shown in FIG. 16.

FIG. 17 is a flow diagram showing an additional interrupting step that may be included in the second illustrative method shown in FIG. 16. The interrupting step may be inserted between the determining step 624 and the loading step 628 of FIG. 16. The interrupting step 640 interrupts at least a portion of the data processing system when the determining step 624 determines that the current microcode patch instruction provided by the second memory element does not correspond to the first instruction.

Having thus described the preferred embodiments of the present invention, those of skill in the art will readily appreciate that the teachings found herein may be applied to yet other embodiments within the scope of the claims hereto attached.

What is claimed is:

1. A data processing system, wherein the data processing system is controlled, at least in part, by a number of sequentially executed instructions, the number of sequentially executed instructions being selected from an instruction set, wherein selected instructions of the instruction set have a corresponding group code associated therewith, the data processing system comprising:

a. an addressable memory element for storing a group of microcode instruction, wherein selected microcode instructions have a corresponding group code associated therewith;

b. a decoder block for sequentially decoding the number of sequentially executed instructions, and providing a corresponding address to said addressable memory element, said addressable memory element providing a microcode instruction that is stored at the corresponding address location, including the corresponding group code therefor;

c. a comparing block coupled to said addressable memory element and further coupled to said decoder block for sequentially comparing the group codes associated with the sequentially executed instructions with the group codes of the resulting microcode instructions; and d. a loading block for loading the addressable memory element with microcode instructions that have a group code that corresponds to the group code of a currently executed instruction if the comparing block determines that the group code of the currently executed instruction does not match the group code of the microcode instruction.

2. A data processing system according to claim 1 further including an interrupt control block, wherein the interrupt control block interrupts the execution of the number of sequentially executed instructions if the comparing block determines that the group code of the currently executed instruction does not match the group code of the microcode instruction.

3. A data processing system according to claim 2 wherein said interrupt control block interrupts the execution of the number of sequentially executed instructions until the loading block loads the addressable memory element with microcode instructions that have a group code that corresponds to the group code of the currently executed instruction.

4. A data processing system according to claim 3 wherein said loading block loads the addressable memory element from a support controller.

5. A data processing system according to claim 4 wherein said loading block uses the group code of the currently executed instruction to identify the microcode instructions within the support controller that are to be loaded into the addressable memory.

6. In a data processing system, wherein the data processing system is controlled, at least in part, by a number of sequentially executed instructions, the number of sequentially executed instructions being selected from an instruction set wherein a first group of the instructions in the instruction set do not require a corresponding microcode patch while a second group of the instructions in the instruction set do require a corresponding microcode patch, the improvement comprising:

a. a first microcode memory element, wherein said first microcode memory element provides a corresponding microcode instruction for controlling at least a portion of the data processing system when any of the instructions associated with the first group of the instruction set is provided to said first microcode memory element;

b. a second microcode memory element, wherein said second microcode memory element provides a corresponding microcode patch for controlling at least a portion of the data processing system when any of the instructions associated with the second group of the instruction set is provided to the second microcode memory element;

c. a detection circuit coupled to said second microcode memory element for detecting if the second microcode memory element includes a microcode patch that corresponds to a selected sequentially executed instruction that is provided to the second microcode memory element; and d. a loading circuit coupled to said second microcode memory element and further coupled to said detecting circuit for loading the second microcode memory element with a microcode patch that corresponds to the selected sequentially executed instruction if the detection circuit detects that the second microcode memory element does not include the corresponding microcode patch.

7. A data processing system according to claim 6 wherein said first microcode memory element is a ROM.

8. A data processing system according to claim 7 wherein said ROM stores a number of microcode instructions, and each of said first group of instructions provides an address to said ROM to access a corresponding microcode instruction.

9. A data processing system according to claim 6 wherein said second microcode memory element is a RAM.

10. A data processing system according to claim 9 wherein said RAM stores a number of microcode patches, and each of said second group of instructions provides an address to said RAM to access a corresponding microcode patch.

11. A data processing system according to claim 6 wherein one of the number of instructions is a currently executed instruction, and wherein said detection circuit detects if said second microcode memory element includes the corresponding microcode patch for the currently executed instruction.

12. A data processing system according to claim 11 wherein said loading circuit loads said second microcode memory element with a microcode patch that correspond to the currently executed instruction if the detection circuit detects that the second microcode memory element does not include the microcode patch for the currently executed instruction.

13. A data processing system according to claim 12 further including an interrupt control block, wherein the interrupt control block interrupts the execution of the number of sequentially executed instructions if the detection circuit detects that the second microcode memory element does not include the corresponding microcode patch for the currently executed instruction.

14. A data processing system according to claim 13 wherein said interrupt control block interrupts the execution of the number of sequentially executed instructions until the loading circuit loads said second microcode memory element with the microcode patch that corresponds to the currently executed instruction.

15. A data processing system according to claim 11 wherein each of the microcode patch elements stored in the second microcode memory element include a number of control bits, wherein the number of control bits identify which of the instructions in the instructions set are supported by the microcode patch.

16. A data processing system according to claim 15 wherein selected ones of the number of instructions in the instruction set include a number of control bits that identify a corresponding microcode patch.

17. A data processing system according to claim 16 wherein said detection circuit compares the number of control bits of the currently executed instruction with the number of control bits of the microcode patch.

18. A data processing system according to claim 17 wherein said detection circuit detects that the second microcode memory element does not include the corresponding microcode patch for the currently executed instruction if the corresponding control bits do not match.

19. A data processing system according to claim 18 wherein said loading circuit loads the second microcode memory element from a support controller.

20. A data processing system according to claim 19 wherein said loading circuit identifies a corresponding microcode patch in the support controller by using the number of control bits associated with the currently executed instruction that identify a corresponding microcode patch.

21. A data processing system according to claim 6 wherein said loading circuit loads the second microcode memory element from a support controller.

22. An instruction processor for controlling at least a portion of a data processing system, comprising:

a. an instruction cache for storing a number of instructions;

b. an instruction decode block coupled to said instruction cache for sequentially receiving a number of instructions from the instruction cache including a currently executed instruction, said instruction decode block decoding the currently executed instruction and providing an instruction address;

c. an instruction decode memory element coupled to said instruction decode block, wherein said instruction decode memory element stores a number of instruction codes, and the instruction address provided by said instruction decode block selects a selected one of the number of instruction codes;

d. a first microcode memory element coupled to said instruction decode memory element, for storing a number of 196: microcode instructions, and the selected one of the number of instruction codes provided by the instruction decode memory element selects a selected one of the microcode instructions;

e. a second microcode memory element coupled to said instruction decode memory element, for storing a number of microcode patch instructions, and the selected one of the number of instruction codes provided by the instruction decode memory element selects a selected one of the microcode patch instructions;

f. a selector block coupled to said first microcode memory element and said second microcode memory element for selecting between the selected one of the microcode instructions and the selected one of the microcode patch instructions;

g. a detection circuit for detecting when the selected microcode patch instruction provided by said second microcode memory element does not correspond to the currently executed instruction;

h. an interrupt control block coupled to said detection circuit for interrupting the instruction processor when said detection circuit detects that the selected microcode patch instruction provided by said second microcode memory element does not correspond to the currently executed instruction; and i. a loading circuit coupled to said detection circuit and said second microcode memory element for loading a corresponding microcode patch instruction into said second microcode memory element when said detection circuit detects that the selected microcode patch instruction does not correspond to the currently executed instruction.

23. An instruction processor according to claim 22 wherein said first microcode memory element is a ROM.

24. An instruction processor according to claim 22 wherein said first microcode memory element is a RAM.

25. An instruction processor according to claim 22 wherein said interrupt control block interrupts the instruction processor until the loading circuit loads said second microcode memory element with the microcode patch instruction that corresponds to the currently executed instruction.

26. An instruction processor according to claim 22 wherein each of the microcode patch elements stored in the second microcode memory element include a number of control bits, wherein the number of control bits identify which of the instructions are supported by the corresponding microcode patch instruction.

27. An instruction processor according to claim 26 wherein said instruction decode block decodes the currently executed instruction and further provides a group field and a patch selector field, wherein the group field identifies a particular microcode patch instruction that corresponds to the currently executed instruction.

28. An instruction processor according to claim 27 wherein the patch selector field is provided to the selector block for selecting between the selected one of the microcode instructions and the selected one of the microcode patch instructions.

29. An instruction processor according to claim 27 wherein the said detection circuit compares the group field of the currently executed instruction with the number of control bits of the selected microcode patch instruction.

30. In instruction processor according to claim 29 wherein said detection circuit detects that the second microcode memory element does not include the corresponding microcode patch instruction for the currently executed instruction if the number of control bits of the selected microcode patch instruction do not match the corresponding group field.

31. A data processing system according to claim 30 wherein said loading circuit loads the second microcode memory element from a support controller.

32. A data processing system according to claim 31 wherein said loading circuit identifies a corresponding microcode patch instruction in the support controller by using the group field associated with the currently executed instruction that identifies a corresponding microcode patch.

33. A data processing system according to claim 22 wherein said loading circuit loads the second microcode memory element from a support controller.

34. In a data processing system, wherein the data processing system is controlled, at least in part, by a number of sequentially executed instructions, the number of sequentially executed instructions being selected from an instruction set wherein a first group of the instructions in the instruction set do not require a corresponding microcode patch while a second group of the instructions in the instruction set do require a corresponding microcode patch, the improvement comprising:

a. first microcode memory means, wherein said first microcode memory means provides a corresponding microcode instruction for controlling at least a portion of the data processing system when any of the instructions associated with the first group of the instruction set is provided to said first microcode memory means;

b. second microcode memory means, wherein said second microcode memory means provides a corresponding microcode patch for controlling at least a portion of the data processing system when any of the instructions associated with the second group of the instruction set is provided to the second microcode memory means;

c. detection means coupled to said second microcode memory means for detecting if the second microcode memory means includes a microcode patch that corresponds to a selected sequentially executed instruction that is provided to the second microcode memory means; and d. loading means coupled to said second microcode memory means and further coupled to said detecting means for loading the second microcode memory means with a microcode patch that corresponds to the selected sequentially executed instruction if the detection means detects that the second microcode memory means does not include the corresponding microcode patch.

35. A data processing system according to claim 34 further including an interrupt control means, wherein the interrupt control means interrupts the execution of the number of sequentially executed instructions if the detection means detects that the second microcode memory means does not include the corresponding microcode patch for the currently executed instruction.

36. A data processing system according to claim 34 wherein the first microcode memory means and the second microcode memory means are separately addressable sections of a single memory element.

37. A data processing system according to claim 36 wherein the single memory element is a RAM.

38. A data processing system according to claim 34 wherein the first microcode memory means and the second microcode memory means are provided on at least two separate memory elements.

39. A data processing system according to claim 34 wherein the first microcode memory means comprises a ROM, and the second microcode memory means comprises a RAM.

40. A method for providing microcode to a data processing system, wherein the data processing system is controlled, at least in part, by a number of sequentially executed instructions, the number of sequentially executed instructions being selected from an instruction set, wherein selected instructions of the instruction set have a corresponding group code associated therewith, the method comprising the steps of:
   a. storing a group of microcode instruction in an addressable memory element, wherein selected microcode instructions have a corresponding group code associated therewith;
   b. decoding the number of sequentially executed instructions, and providing a corresponding address to said addressable memory element;
   c. providing a microcode instruction for each of the number of sequentially executed instructions that is stored at the corresponding address location of the addressable memory element, including the corresponding group code therefor;
   d. comparing the group codes associated with the sequentially executed instructions with the group codes of the resulting microcode instructions; and
   e. loading the addressable memory element with microcode instructions that have a group code that corresponds to the group code of a currently executed instruction if the comparing step determines that the group code of the currently executed instruction does not match the group code of the microcode instruction.

41. A method according to claim 40 further comprising the step of:
   a. interrupting at least a portion of the data processing system when said comparing step determines that the group code of the currently executed instruction does not match the group code of the microcode instruction.

42. A method for providing a number of microcode patch instructions to a data processing system, wherein the data processing system is controlled, at least in part, by a number of sequentially executed instructions, the number of sequentially executed instructions being selected from an instruction set wherein a first group of the instructions in the instruction set do not require a corresponding microcode patch instruction while a second group of the instructions in the instruction set do require a corresponding microcode patch instruction, the method comprising the steps of:
   a. storing a number of microcode instructions in a first memory element, wherein the number of microcode instructions correspond to selected instructions of the instruction set;
   b. storing a number of microcode patch instructions in a second memory element, wherein the number of microcode patch instructions correspond to selected instructions of the instruction set;
   c. decoding a first instruction selected from the second group of instructions to providing a corresponding address, and providing the corresponding address to the second memory element;
   d. selecting a current microcode patch instruction from the second memory element that corresponds to the corresponding address;
   e. determining if the current microcode patch instruction corresponds to the first instruction; and
   f. loading a new microcode patch instruction into the second memory element, wherein the new microcode patch instruction corresponds to the first instruction, if the determining step determines that the current microcode patch instruction does not correspond to the first instruction.

43. A method according to claim 42 further comprising the step of:
   a. interrupting at least a portion of the data processing system when said determining step determines that the current microcode patch instruction provided by the second memory element does not correspond to the first instruction.

44. A method according to claim 42 wherein each of the microcode patch instructions stored in the second memory element include a number of control bits, wherein the number of control bits identify which of the instructions in the instruction set are supported by the microcode patch instruction.

45. A method according to claim 42 wherein said decoding step further provides a group field for the first instruction, wherein the group field identifies a particular microcode patch instruction that corresponds to the first instruction.

46. A method according to claim 45 wherein said determining step compares the group field of the first instruction with the number of control bits of the current microcode patch instruction, and determines that the second memory element does not include the microcode patch instruction that corresponds to the first instruction if the control bits of the current microcode patch instruction do not match the group field of the first instruction.

47. A method according to claim 46 wherein said loading circuit loads the second memory element from a support controller.

48. A method according to claim 47 wherein said loading circuit identifies a corresponding microcode patch instruction in the support controller by using the group field associated with the first instruction.

* * * * *